United States Patent
Yazicioglu et al.

(10) Patent No.: US 9,946,776 B1
(45) Date of Patent: Apr. 17, 2018

(54) SYSTEMS AND METHODS FOR IMPORTING DATA FROM ELECTRONIC DATA FILES

(71) Applicant: Palantir Technologies Inc., Palo Alto, CA (US)

(72) Inventors: Stephen Yazicioglu, McLean, VA (US); Christopher Luck, Washington, DC (US); Robert Giardina, Falls Church, VA (US); Justin Streufert, Germantown, MD (US); Timothy Slatcher, London (GB); Gregory O'Connor, London (GB); Brandon Marc-Aurele, Arlington, VA (US); Olivia Zhu, Saratoga, CA (US); Howard Schindel, Washington, DC (US); Henry Tung, Palo Alto, CA (US); Lucas Ray, San Francisco, CA (US); Christopher Leech, Pittsburgh, PA (US); Eric Jeney, Metuchen, NJ (US); Stefan Negrus, Washington, DC (US); Jason Lee, Berkeley, CA (US); Alessandro Mingione, London (GB); John McKinstry Doyle, Washington, DC (US); Hunter Pitelka, Arlington, VA (US); Ethan Lozano, Los Altos Hills, CA (US); Joel Ossher, Vienna, VA (US); Matthew Fedderly, Baltimore, MD (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 15/292,075

(22) Filed: Oct. 12, 2016

Related U.S. Application Data

(63) Continuation of application No. 15/092,814, filed on Apr. 7, 2016, now Pat. No. 9,514,205.

(Continued)

(51) Int. Cl.
*G06F 17/30* (2006.01)

(52) U.S. Cl.
CPC .. *G06F 17/30563* (2013.01); *G06F 17/30365* (2013.01)

(58) Field of Classification Search
None
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |

(Continued)

FOREIGN PATENT DOCUMENTS

| | | |
|---|---|---|
| DE | 102014103482 A1 | 9/2014 |
| EP | 1647908 A2 | 4/2006 |

(Continued)

OTHER PUBLICATIONS

"A Quick Guide to UniProtKB Swiss-Prot & TrEMBL", UniProt Consortium, Ongoing and future developments at the Universal Protein Resource, (Sep. 2011), 1-2.

(Continued)

*Primary Examiner* — Hung Le
(74) *Attorney, Agent, or Firm* — Schwegman Lundberg & Woessner, P.A.

(57) ABSTRACT

Computer implemented systems and methods are disclosed for importing data from electronic data files. In accordance with some embodiments, source electronic data files are received at a data importation system and managed by the data importation system. The data importation system may load detector/transformer plugins and determined whether any of the load detector/transformer plugins apply to the received source electronic data files. The data importation system may also generate transformed data using a transformer corresponding to a detector that applies to the source electronic data files. The data importation system may (Continued)

import the transformed data into at least one of a data analysis system and a database.

12 Claims, 19 Drawing Sheets

Related U.S. Application Data

(60) Provisional application No. 62/214,874, filed on Sep. 4, 2015.

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Zbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bigham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,701,352 B1 | 3/2004 | Gardner et al. | |
| 6,718,336 B1* | 4/2004 | Saffer | G06F 17/30557 |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,968,329 B1* | 11/2005 | Chung | G06F 17/30905 |
| | | | 706/45 |
| 6,976,024 B1 | 12/2005 | Chavez, Jr. et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,707,230 B1* | 4/2010 | Brenner | G06F 17/30241 |
| | | | 707/803 |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger | |
| 8,073,857 B2 | 12/2011 | Sreekanth | |
| 8,103,962 B2 | 1/2012 | Embley et al. | |
| 8,417,715 B1 | 4/2013 | Bruckhaus | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing et al. | |
| 8,639,552 B1 | 4/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,292,388 B2 | 3/2016 | Fisher et al. | |
| 9,514,205 B1 | 12/2016 | Yazicioglu | |
| 2002/0087744 A1* | 7/2002 | Kitchin | G06F 8/20 |
| | | | 719/331 |
| 2002/0124005 A1* | 9/2002 | Matson | G06F 17/30893 |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0117386 A1* | 6/2004 | Lavender | G06F 21/6236 |
| 2004/0126840 A1 | 7/2004 | Cheng et al. | |
| 2004/0132592 A1 | 7/2004 | Yu | |
| 2004/0139212 A1 | 7/2004 | Mukherjee et al. | |
| 2004/0153837 A1 | 8/2004 | Preston et al. | |
| 2004/0172592 A1 | 9/2004 | Collie et al. | |
| 2004/0193608 A1 | 9/2004 | Gollapudi et al. | |
| 2004/0236796 A1 | 11/2004 | Bhatt et al. | |
| 2005/0004911 A1 | 1/2005 | Goldberg et al. | |
| 2005/0021397 A1 | 1/2005 | Cui et al. | |
| 2005/0022111 A1 | 1/2005 | Collet et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0257125 A1 | 11/2005 | Roesner et al. | |
| 2005/0278286 A1 | 12/2005 | Djugash et al. | |
| 2006/0004740 A1 | 1/2006 | Dettinger et al. | |
| 2006/0047717 A1 | 3/2006 | Pereira | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0236307 A1* | 10/2006 | Debruin | G06F 8/51 |
| | | | 717/117 |
| 2006/0271884 A1 | 11/2006 | Hurst | |
| 2006/0288046 A1 | 12/2006 | Gupta | |
| 2007/0005582 A1 | 1/2007 | Navratil et al. | |
| 2007/0005635 A1 | 1/2007 | Martinez et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0114797 A1 | 5/2008 | Jones et al. | |
| 2008/0114997 A1 | 5/2008 | Chin | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2008/0270950 A1 | 10/2008 | Whitehead | |
| 2009/0006150 A1 | 1/2009 | Prigge et al. | |
| 2009/0006610 A1* | 1/2009 | Venable | H04N 1/00795 |
| | | | 709/224 |
| 2009/0007056 A1 | 1/2009 | Prigge et al. | |
| 2009/0024639 A1* | 1/2009 | Steinmann | G06F 17/30557 |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0282068 A1 | 11/2009 | Shockro | |
| 2009/0299830 A1 | 12/2009 | West et al. | |
| 2010/0011282 A1 | 1/2010 | Dollard et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |

(56) References Cited

U.S. PATENT DOCUMENTS

| | | |
|---|---|---|
| 2010/0169376 A1 | 7/2010 | Chu |
| 2010/0169405 A1 | 7/2010 | Zhang |
| 2010/0199167 A1* | 8/2010 | Uematsu ............... G06F 17/24 |
| | | 715/234 |
| 2010/0313119 A1 | 12/2010 | Baldwin et al. |
| 2011/0035396 A1 | 2/2011 | Merz et al. |
| 2011/0035667 A1 | 2/2011 | Dittmer-roche |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0119583 A1 | 5/2011 | Gilley et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0262061 A1* | 10/2013 | Laake .................... G01V 1/345 |
| | | 703/6 |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0156711 A1 | 6/2014 | Sharan et al. |
| 2014/0214579 A1 | 7/2014 | Shen et al. |
| 2014/0244388 A1 | 8/2014 | Manouchehri et al. |
| 2015/0112641 A1* | 4/2015 | Faraj ..................... G06F 11/079 |
| | | 702/186 |
| 2015/0269030 A1 | 9/2015 | Fisher et al. |
| 2016/0026923 A1 | 1/2016 | Erenrich et al. |
| 2016/0085764 A1* | 3/2016 | Sarkar ............... G06F 17/30079 |
| | | 707/610 |
| 2016/0092476 A1* | 3/2016 | Stojanovic .......... G06F 3/04847 |
| | | 707/805 |
| 2016/0161621 A1* | 6/2016 | Salama ................. G01V 1/282 |
| | | 702/17 |

FOREIGN PATENT DOCUMENTS

| | | | |
|---|---|---|---|
| EP | 2634745 | A1 | 9/2013 |
| EP | 2743839 | A1 | 6/2014 |
| EP | 2778986 | A1 | 9/2014 |
| EP | 2921975 | A1 | 9/2015 |
| GB | 2366498 | A | 3/2002 |
| GB | 2508503 | B | 1/2015 |
| GB | 2508293 | B | 4/2015 |
| HK | 1194178 | B | 4/2015 |
| NZ | 616212 | A | 1/2015 |
| NZ | 622485 | A | 3/2015 |
| NZ | 616299 | A | 4/2015 |
| WO | WO-0034895 | A1 | 6/2000 |
| WO | WO-2010030917 | A2 | 3/2010 |
| WO | WO-2013030595 | A1 | 3/2013 |

OTHER PUBLICATIONS

"A Tour of Pinboard", [Online] Retrieved from the Internet: <https://pinboard.in/tour/>, (May 15, 2014), 1-6.

"U.S. Appl. No. 13/411,291, Examiner Interview Summary dated Oct. 1, 2013", 3 pgs.

"U.S. Appl. No. 13/411,291, Non Final Office Action dated Jul. 15, 2015", 39 pgs.

"U.S. Appl. No. 13/411,291, Notice of Allowance dated Apr. 22, 2016", 27 pgs.

"U.S. Appl. No. 13/608,864, Final Office Action dated Jun. 8, 2015", 23 pgs.

"U.S. Appl. No. 13/608,864, First Action Interview Pre-Interview Communication dated Mar. 17, 2015", 16 pgs.

"U.S. Appl. No. 13/657,635, Final Office Action dated Oct. 7, 2015", 43 pgs.

"U.S. Appl. No. 13/657,635, Non Final Office Action dated Mar. 30, 2015", 31 pgs.

"U.S. Appl. No. 13/657,635, Notice of Allowance dated Jan. 29, 2016", 10 pgs.

"U.S. Appl. No. 13/657,656, Final Office Action dated May 6, 2015", 29 pgs.

"U.S. Appl. No. 13/657,656, Non Final Office Action dated Oct. 7, 2014", 16 pgs.

"U.S. Appl. No. 13/767,779, Notice of Allowance dated Mar. 17, 2015", 28 pgs.

"U.S. Appl. No. 13/827,627, Examiner Interview Summary dated Oct. 20, 2015", 3 pgs.

"U.S. Appl. No. 13/827,627, Final Office Action dated Aug. 26, 2015", 21 pgs.

"U.S. Appl. No. 13/827,627, Non Final Office Action dated Mar. 2, 2015", 22 pgs.

"U.S. Appl. No. 13/827,627, Non Final Office Action dated Dec. 22, 2015", 12 pgs.

"U.S. Appl. No. 13/831,791, Final Office Action dated Aug. 6, 2015", 19 pgs.

"U.S. Appl. No. 13/831,791, Non Final Office Action dated Mar. 4, 2015", 20 pgs.

"U.S. Appl. No. 14/019,534, Examiner Interview Summary dated Sep. 4, 2015", 5 pgs.

"U.S. Appl. No. 14/019,534, First Action Interview Pre-interview Communication dated Jul. 20, 2015", 4 pgs.

"U.S. Appl. No. 14/019,534, Notice of Allowance dated Feb. 4, 2016", 20 pgs.

"U.S. Appl. No. 14/025,653, First Action Interview Pre-Interview Communication dated Mar. 3, 2016", 9 pgs.

"U.S. Appl. No. 14/025,653, First Action Interview Pre-Interview Communication dated Oct. 6, 2015", 13 pgs.

"U.S. Appl. No. 14/134,558, Non Final Office Action dated Oct. 7, 2015", 9 pgs.

"U.S. Appl. No. 14/254,757, Notice of Allowance dated Sep. 10, 2014", 30 pgs.

"U.S. Appl. No. 14/254,773, Notice of Allowance dated Aug. 20, 2014", 23 pgs.

"U.S. Appl. No. 14/304,741, Final Office Action dated Mar. 3, 2015", 24 pgs.

"U.S. Appl. No. 14/304,741, Notice of Allowance dated Apr. 7, 2015", 22 pgs.

"U.S. Appl. No. 14/304,741, Pre-Interview Communication dated Aug. 6, 2014", 13 pgs.

"U.S. Appl. No. 14/562,524, Final Office Action dated Feb. 18, 2016", 20 pgs.

"U.S. Appl. No. 14/581,902, Notice of Allowance dated Nov. 13, 2015", 16 pgs.

"U.S. Appl. No. 14/877,229, Non Final Office Action dated Mar. 22, 2016", 46 pgs.

"U.S. Appl. No. 15/092,814, Notice of Allowance dated Aug. 25, 2016", 11 pgs.

"U.S. Appl. No. 15/292,078, Non Final Office Action dated May 16, 2017", 11 pgs.

"U.S. Appl. No. 15/292,078, Response filed Aug. 16, 2017 to Non Final Office Action dated May 16, 2017", 14 pgs.

(56) References Cited

OTHER PUBLICATIONS

"Australian Application Serial No. 2013237658, Office Action dated Feb. 2, 2015", 5 pgs.
"Australian Application Serial No. 2013237710, Office Action dated Jan. 16, 2015", 3 pgs.
"Australian Application Serial No. 2014201580, Office Action dated Jan. 16, 2015", 2 pgs.
"Canadian Application Serial No. 2,807,899, Office Action dated Feb. 27, 2015", 3 pgs.
"Canadian Application Serial No. 2,807,899, Office Action dated Jul. 20, 2015", 4 pgs.
"Canadian Application Serial No. 2,828,264, Office Action dated Apr. 28, 2015", 4 pgs.
"Canadian Application Serial No. 2,829,266, Office Action dated Apr. 1, 2016", 4 pgs.
"Canadian Application Serial No. 2,829,266, Office Action dated Apr. 28, 2015", 3 pgs.
"Delicious: Save, Organize, and Remember the Links You find Intersting or Useful Around the Web", [Online]. Retrieved from the Internet: <URL: https://delicious.com/>, (2014), 1 pg.
"European Application Serial No. 13157474.1, Office Action dated Oct. 30, 2015", 5 pgs.
"European Application Serial No. 14159175.0, Office Action dated Feb. 4, 2016", 5 pgs.
"European Application Serial No. 14159175.0, Office Action dated Jul. 17, 2014", 10 pgs.
"European Application Serial No. 14159629.6, Extended European Search Report dated Jul. 31, 2014", 7 pgs.
"European Application Serial No. 14159629.6, Office Action dated Sep. 22, 2014", 2 pgs.
"European Application Serial No. 15159520.4, Extended European Search Report dated Jul. 15, 2015", 9 pgs.
"European Application Serial No. 16187129.8, Extended European Search Report dated May 30, 2017", w/ English Translation, 9 pgs.
"Frequently Asked Questions about Office Binder 97", [Online]. Retrieved from the Internet: <URL: http://web.archive.org/web/20100210112922/http://support.microsoft.com/kb/843147>, (Accessed Dec. 18, 2006), 5 pgs.
"German Application Serial No. 102013221052.3, Office Action dated Mar. 24, 2015", with English translation of claims, 17 pgs.
"German Application Serial No. 102013221057.4, Office Action dated Mar. 23, 2015", with English translation, 17 pgs.
"Great Britain Application Serial No. 1404574.4, Office Action dated Dec. 18, 2014".
"Machine Code", Wikipedia, [Online]. Retrieved from the Internet: <URL: http://en.wikipedia.org/wiki/Machine_code>, (Accessed Aug. 11, 2014), 1-5.
"Netherlands Application Serial No. 2011613, Netherlands Search Report dated Aug. 13, 2015", W/ English Translation, 7 pgs.
"Netherlands Application Serial No. 2011627, Netherlands Search Report dated Aug. 14, 2015", W/ English Translation, 9 pgs.
"Netherlands Application Serial No. 2012437, Netherlands Search Report dated Sep. 18, 2015", W/ English Translation, 7 pgs.
"New Zealand Application Serial No. 616212, Notice of Allowance dated Jan. 23, 2015", 1 pg.
"New Zealand Application Serial No. 616299, Notice of Allowance dated Apr. 7, 2015", 1 pg.
"New Zealand Application Serial No. 616299, Office Action dated Jan. 26, 2015", 2 pgs.
"New Zealand Application Serial No. 622414, Office Action dated Mar. 24, 2014", 2 pgs.
"New Zealand Application Serial No. 622484, Office Action dated Apr. 2, 2014", 2 pgs.
"New Zealand Application Serial No. 622485, Notice of Allowance dated Nov. 24, 2014", 1 pg.
"New Zealand Application Serial No. 622485, Office Action dated Nov. 21, 2014", 1 pg.
"The FASTA Program Package", fasta-36.3.4, (Mar. 25, 2011), 1-29.
et al., "This file does not have a program associated with it—what does this mean and what do I do?", Ask Leo! XP55374492, [Online]. [Archived Apr. 18, 2015]. Retrieved from the Internet: <URL: :https://web.archive.org/web/20150418180501/https://askleo.com/this_file_does_not_have_a_program_associ ated_wi th_it_what_does_this_mean_and_what_do i_do/>, (Apr. 18, 2015), 29 pgs.
Alur, Nagraj, et al., "Chapter 2: IBM InfoSphere DataStage Stages", IBM InfoSphere DataStage Data Flow and Job Design, pp. 35-137, (Jul. 1, 2008), 106 pgs.
Bae, Jinuk, et al., "Partitioning Algorithms for the Computation of Average Iceberg Queries", DaWaK 2000, LNCS 1874, (2000), 276-286.
Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.
Bogle, Phillip, et al., "Reducing Cross Domain Call Overhead Using Batched Futures", SIGPLAN No. 29, 10, OOPSLA '94, (Oct. 1994), 341-354.
Bogle, Phillip, "Reducing Cross-Domain Call Overhead Using Batched Futures (Submitted to the Dept. of Electrical Engineering and Computer Science in partial fulfillment of the requirement for the degree of Master of Science in Computer Science and Engineering)", Massachusetts Institute of Technology, (1994), 1-96.
Bouajjani, Ahmed, et al., "Analysis of Recursively Parallel Programs", POPL'12, (Jan. 2012), 203-214.
Canese, Kathi, et al., "Chapter 2: PubMed: The Bibliographic Database", The NCBI Handbook, (Oct. 2002), 1-10.
Chazelle, Bernard, et al., "The Bloomier Filter: An Efficient Data Structure for Static Support Lookup Tables", SODA '04 Proceedings of the Fifteenth Annual ACMSIAM Symposium on Discrete Algorithms, (2004), 30-39.
Delcher, Arthur, et al., "Identifying Bacterial Genes and Endosymbiont DNA with Glimmer", BioInformatics, vol. 23, No. 6, (2007), 673-679.
Donjerkovic, Donko, et al., "Probabilistic Optimization of Top N Queries", Proceedings of the 25th VLDB Conference, (1999), 411-422.
Fang, Min, et al., "Computing Iceberg Queries Efficiently", Proceedings of the 24th VLDB Conference, (1998), 299-310.
Goldstein, Seth Copen, et al., "Stacks Lazy Threads: Implementing a Fast Parallel Call", Journal of Parallel and Distributed Computing, (Jan. 1996), 5-20.
Han, Jiawei, et al., "Efficient Computation of Iceberg Cubes with Complex Measures", ACM Sigmod (May 21-24, 2001), 1-12.
Ivanova, Milena, et al., "An Architecture for Recycling Intermediates in a Column-store", Proceedings of the 35th Sigmod International Conference on Management of Data, SIGMOD '09, (Jun. 29, 2009), 309-320.
Jacques, Mathieu, "An Extensible Math Expression Parser with Plug-ins—Code Project", [Online]. Retrieved from the Internet: <URL: http://www.codeproject.com/Articles/7335/An-extensible-math-expression-parser-with-plug-ins>, (Mar. 13, 2008), 1-34.
Jenks, Stephen, et al., "Nomadic Threads: A Migrating Multithreaded Approach to Remote Memory Accesses in Multiprocessors", Parallel Architectures and Compilation Techniques, (Oct. 1996), 2-11.
Kahan, J., et al., "Annotea: an open RDF Infrastructure for Shared Web Annotations", Computer Networks vol. 39, No. 5, (2002), 589-608.
Karp, Richard, et al., "A Simple Algorithm for Finding Frequent elements in Streams and Bags", ACM Transactions on Database Systems, vol. 28, No. 1, (Mar. 2003), 51-55.
Kitts, Paul, "Chapter 14: Genome Assembly and Annotation Process", The NCBI Handbook, (Oct. 2002), 1-21.
Leela, Krishna P, et al., "On Incorporating Iceberg Queries in Query Processors", Lecture Notes in Computer Science: Database Systems for Advanced Applications, vol. 2973, Springer Berlin Heidelberg, (2004), 431-442.
Liu, Hongyan, et al., "Methods for Mining Frequent Items in Data Streams: An Overview", Knowledge and Information Systems, vol. 26, No. 1, (Jan. 2011), 1-30.

(56) References Cited

OTHER PUBLICATIONS

Madden, "Chapter 16: BLAST Sequence Analysis Tool", The NCBI Handbook, (Oct. 2002), 1-15.
Mendes, Pablo, et al., "TcruziKB: Enabling Complex Queries for Genomic Data Exploration", IEEE International Conference on Semantic Computing, (Aug. 2008), 432-439.
Mizrachi, Ilene, "Chapter 1: GenBank: The Nucleotide Sequence Database", The NCBI Handbook, (Oct. 2002), 1-14.
Russell, Alastair, et al., "Nitelight: A Graphical Tool for Semantic Query Construction", University of Southhampton, UK, (2008), 1-10.
Sigrist, Christian, et al., "Prosite, a Protein Domain Database for Functional Characterization and Annotation", Nucleic Acids Research, vol. 38, (2010), D161-D166.
Sirotkin, Karl, et al., "Chapter 13: The Processing of Biological Sequence Data at NCBI", The NCBI Handbook, (Oct. 2002), 1-11.
Smart, Paul, et al., "A Visual Approach to Semantic Query Design Using a Web-Based Graphical Query Designer", 16th International Conference on Knowledge Engineering and Knowledge Management (EKAW), (2008), 16 pgs.
Stamos, James, et al., "Remote Evaluation", ACM Transactions on Programming Languages and Systems, vol. 12, No. 4, (Oct. 1990), 537-565.
Wollrath, Ann, et al., "A Distributed Object Model for the Java System", Proceedings of the 2nd Conference on USENEX, Conference on Object-Orients Technologies and Systems, (Jun. 1996), 219-231.

* cited by examiner

DATA IMPORTER  [UPLOAD FILES] — 710

700

| | NAME — 704 | TYPE — 706 | DATE MODIFIED — 708 |
|---|---|---|---|
| US v. CORP. CASE #12345 | | | |
| WARRANT #1049383 — 702 | FILE1.TXT | UNSTRUCTURED DATA | JANUARY 23, 2015 11:36 A.M. |
| | FILE2.MSG | EMAIL | JUNE 4, 2015 2:18 P.M. |
| SUBPOENA #102933 | FILE3.XLS | STRUCTURED DATA | FEBRUARY 2, 2015 1:23 P.M. |

*FIG. 7A*

DATA IMPORTER | UPLOAD FILES

US v. CORP.
CASE #12345

| | NAME | TYPE | DATE MODIFIED |
|---|---|---|---|
| WARRANT #1049383 | FILE1.TXT | UNSTRUCTURED DATA | JANUARY 23, 2015 11:36 A.M. |
| | DOWNLOAD MSG — 712 | EMAIL | JUNE 4, 2015 2:18 P.M. |
| SUBPOENA #102933 | XLS | STRUCTURED DATA | FEBRUARY 2, 2015 1:23 P.M. |

Context menu at 712:
- PROCESS
- DOWNLOAD
- UPDATE
- DELETE

DATA IMPORTER  [UPLOAD FILES]

700

| NAME | TYPE | DATE MODIFIED |
|---|---|---|
| US v. CORP. CASE #12345 | | |
| WARRANT #1049383 | UNSTRUCTURED DATA | JANUARY 23, 2015  11:36 A.M. |
| ....XT | EMAIL | JUNE 4, 2015  2:18 P.M. |
| ....SG | | |
| SUBPOENA #102933 FILE3.XLS | STRUCTURED DATA | FEBRUARY 2, 2015  1:23 P.M. |

Popup menu (714): MAP DATA / DOWNLOAD / UPDATE / DELETE

FILE TYPE MAPPER

CHOOSE A TRANSFORMATION TEMPLATE

▶ WILDLIFE TRACKING DATA

- ANIMAL NAME
- ANIMAL SPECIES
- DATE/TIME
- DEPTH (M)
- LOCATION
- TRANSMITTER ID

| SELECT DATA FIELD ▶ | SELECT DATA FIELD ▶ | SELECT DATA FIELD ▶ | SELECT DATA FIELD ▶ | SELECT DATA FIELD ▶ |
|---|---|---|---|---|
| DATE | ON/OFF | TIME (UTC) | LAT (N) | LONG (W) |
| 5/3/00 | OFF | 2155 | 4203.9 | 6940.1 |
| 5/5/00 | OFF | 1330 | 4116.6 | 4264.1 |

*FIG. 8D*

SYSTEMS AND METHODS FOR IMPORTING DATA FROM ELECTRONIC DATA FILES

PRIORITY CLAIM

This application is a continuation of and claims the benefit of priority to U.S. application Ser. No. 15/092,814, filed on Apr. 7, 2016, entitled "SYSTEMS AND METHODS FOR IMPORTING DATA FROM ELECTRONIC DATA FILES," which claims the benefit of priority of U.S. Provisional Application Ser. No. 62/214,874, entitled "SYSTEMS FOR IMPORTING DATA FROM ELECTRONIC DATA FILES," filed on Sep. 4, 2015, both of which are hereby incorporated by reference.

BACKGROUND

Systems and methods for importing data from multiple electronic files can be relatively straightforward in some situations. In one example scenario, a conventional importation system identifies common fields in a set of electronic files that include data in a similar format and layout. The fields can be isolated using filtering functions of the system's data importation software and the desired information retrieved. The isolated data can then be aggregated so as to provide a report including all the records that together constitute the desired information.

One problem arises when conventional data importation systems receive electronic files including fields that lack commonality or differ within a given electronic file set. For example, spreadsheets received from different Banks that include wire transfer bank transaction data may include data fields that are arranged or configured differently. As another example, the data included in common fields (e.g., transaction amount) within a set of electronic files may be presented in different formats (e.g., dollars, thousands of dollars, Euros, CAD, 12-hour time, 24-hour time etc.). These problems intensify when large numbers of electronic files (e.g., millions of electronic files) are received by conventional data importation systems.

One solution to this shortcoming is to have an engineer write a new data importation software algorithm for each electronic file with a unique layout. This solution, however, is time consuming and expensive because a data importation system may receive hundreds of unique file layouts from thousands of different organizations.

Another shortcoming arises when a user imports electronic data files into a data analysis system using a conventional data importation system. Data analysis systems allow users to explore and manipulate data that has been imported and integrated into a coherent data model by a data importation system. For example, a data analysis system may allow users to visualize relationships, test hypotheses, and discover connections from data imported from numerous (and disparate) data sources. Conventional data importation systems may not, however, provide access to original source electronic data files from which data has been imported to one or more data analysis systems. As a result, data analysis systems may be unable to identify original source electronic data files and provide access to, or the ability to download, original source electronic data files.

Conventional data importation systems may also have shortcomings with handling importation of electronic files into multiple data analysis systems. For example, a first data analysis system may allow users to modify, tag, and change electronic data files that have been up imported into the first data analysis system and a second data analysis system. Conventional data importation systems may be unable to track the changes made to the copies of the electronic data files in the first data analysis system and update the copies of the electronic data files in the second data analysis system with those changes.

Conventional data importation systems may also have scalability issues when handling importation of a large number of electronic files. One scalability issue involves tracking the status of each electronic data file. For example, the conventional data importation system may not have the capabilities to keep track of which electronic data files have been imported, which electronic data files have been modified (or have modified metadata), and which electronic data files have been deleted.

Another shortcoming of conventional data importation systems arises with managing customization of data importation systems. For example, an engineer may write a first data importation software algorithm for a first instance of a conventional data importation system and may want to deploy that algorithm for one or more additional instances of the conventional data importation system. Any customizations to the deployed instances of the conventional data importation system may cause incompatibilities with future updates applied across deployed instances of the conventional data importation system. As a result, the engineer may need to manually resolve issues with conflicting customizations each time an update is to be applied.

A further shortcoming arises when a user wants to delete an electronic data file and any data (or transformed electronic files) imported into a data analysis system by a conventional data importation system. A user of a data analysis system who may want to delete certain data from the data analysis system may be unable to do so because the user cannot identify the original source electronic data file from which the data was imported. Moreover, a user may be unable to delete electronic data files on multiple data analysis platforms because the user cannot identify the original source electronic data file from which the data was imported.

BRIEF DESCRIPTION OF THE DRAWINGS

Reference will now be made to the accompanying drawings, which illustrate exemplary embodiments of the present disclosure and in which:

FIG. 7A-7C are illustrations of an exemplary graphical user interface for importing data from electronic data files, consistent with embodiments of the present disclosure.

FIG. 8A-8D are illustrations of exemplary graphical user interfaces for generating file type profiles, consistent with embodiments of the present disclosure.

DETAILED DESCRIPTION OF EXEMPLARY EMBODIMENTS

Figure 1A:
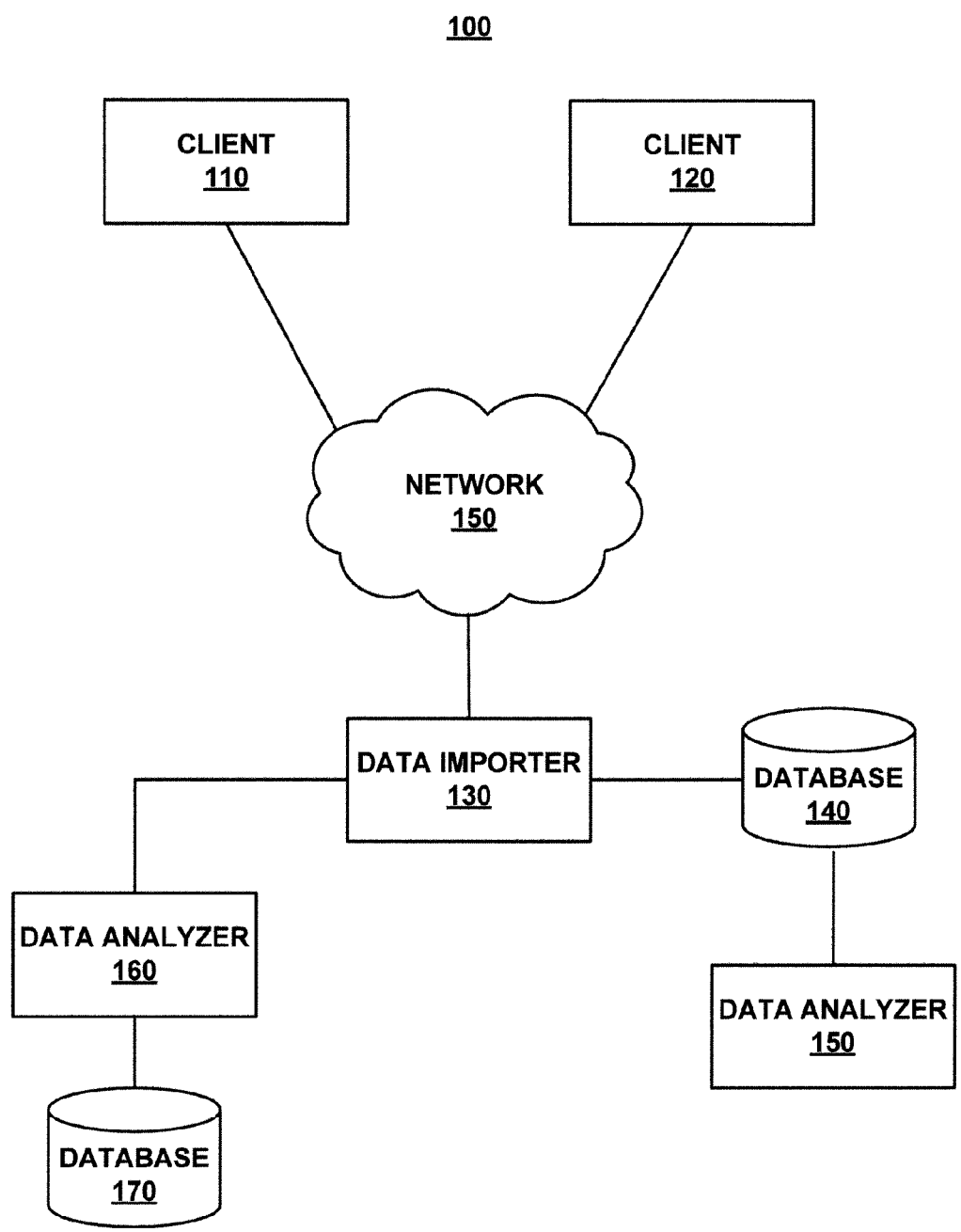
FIGS. 1A and 1B are block diagrams of example embodiments of a system for importing data from electronic data files, consistent with embodiments of the present disclosure.

Reference will now be made in detail to exemplary embodiments, the examples of which are illustrated in the accompanying drawings. Whenever possible, the same reference numbers will be used throughout the drawings to refer to the same or like parts.

The disclosed embodiments describe improved methods and systems for importing data from electronic data files. The improved data importation systems and methods can import data from electronic data files even when the files include data fields that lack commonality or differ across a given data type using a detector/transformer framework. The detector/transformer framework may include one or more detectors for detecting a data type associated with an electronic data file and one or more transformers for transforming the electronic data file based on the detected data type. The data included in received electronic data files may relate to a broad array of technological areas. For example, the data may relate to technological areas of law enforcement (e.g., counter terrorism and criminal activity), litigation (e.g., documents produced for discovery), business (e.g., sales performance, stock market trades, and operating profitability), research and development (e.g., new drug studies, etc.), healthcare (e.g., data associated with common side effects among patients taking a new drug), or any other purpose. The disclosed data importation systems and methods may transform the data included in received electronic data files so that the data is compatible for importing into one or more data analysis systems, databases, or any combination thereof. For example, the disclosed data importation systems and methods may transform data included in an electronic data file may be transformed into an XML format as required by a data analysis system, into a text file with entries separated by semicolons, or may be left as-is.

The disclosed data importation systems and methods further improve upon conventional data importation systems and methods by providing a more flexible and streamlined interface for mapping electronic file types to transformation templates. With minimal user input, the disclosed data importation systems and methods can quickly generate mappings for new electronic file types to existing transformation templates where conventional data importation systems and methods typically required an engineer to write a new mapping algorithm each time a new electronic file type was received. The disclosed data importation systems and methods may receive user input in the form of selection of a file format, a file type identifier, a transformation template, and a list of data field mappings, and automatically create a file type mapping based on the received inputs. The received information may be stored as a file type profile associated with the electronic data file in a database.

Accordingly, the improved data importation methods and systems are designed to allow a user to walk the improved data importation systems through the process of building transformations of electronic data files without the need to write specific software for each transformation. Users who do not understand the nuances of software development are provided with the capability to write software for the systems by building out a series of transformations for the data stored in the electronic data files. The improved data importation systems provide feedback to users on how the transformed file will look as they work through the transformation process. Some examples of user feedback include real-time updates of spreadsheet views of the data as the user applies transformations, a histogram view of their data as they model it, a history view to show the user the exact order of transformations they have applied to the data, and user interface (UI) cues to show errors in the selected transformations (e.g., values mapped to a date that are not valid dates).

The improved data importation systems provide the user with the ability to specify a broad range of transformations. For example, if a received wire transfer bank transaction electronic data file includes separate data fields for transfer date and time, and the wire transfer bank transaction transformation template requires a single data field of date/time, the disclosed data importation systems and methods can automatically transform the transfer date and time fields in the received file by combining those data fields into one data field. As another example, if a received brokerage account statement electronic data file includes data in the "date a security was sold or bought" that is formatted as DD/MM/YYYY, and the brokerage account transformation template requires the date to be in the format DD/MM/YY, the disclosed data importation systems and methods can automatically transform the dates in the received file to match the required date format. A further example includes cell phone carrier call records that are received in different formats from each carrier yet all include the same information (e.g., caller, call recipient, call time, cell tower identifier, etc.). Accordingly, unlike conventional methods and data importation systems, the disclosed methods and data importation systems can quickly and easily aggregate data received in numerous dissimilar formats and configurations automatically, thereby resulting in improved functionality of the underlying data importation systems.

Once the data included in the received electronic data files has been transformed, the disclosed data importation systems and methods can import and store the transformed data, such as in a transformed electronic data file, with any corresponding metadata. Further, the disclosed data importation systems and methods can import the transformed electronic data file into one or more data analysis systems or databases and aggregate the imported data so as to provide a report including all the records that together constitute the desired information. Moreover, the improved data importation and systems and methods can provide a report on whether the importing of the transformed electronic file successfully occurred and where and how the transformed electronic file is stored in the one or more data analysis systems or databases.

Figure 1B:
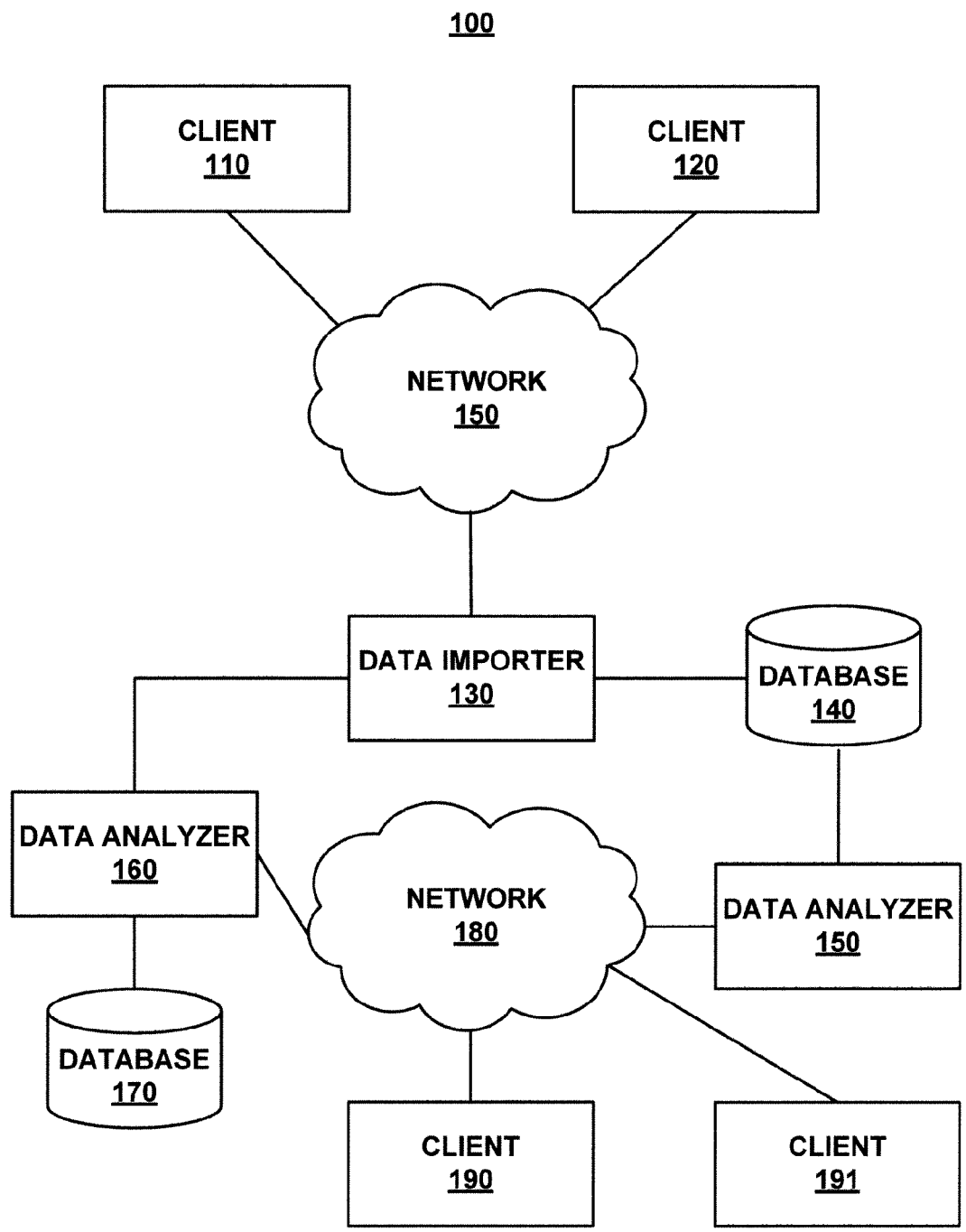

FIGS. 1A and 1B are block diagrams of example embodiments of a system environment 100 for importing data from electronic data files, consistent with embodiments of the present disclosure. As shown in FIGS. 1A and 1B, system environment 100 includes a number of components. It will be appreciated from this disclosure, however, that the number and arrangement of these components is exemplary only and provided for purposes of illustration. Other arrangements and numbers of components may be utilized without departing from the teachings and embodiments of the present disclosure.

As shown in the example embodiment of FIG. 1A, one embodiment of system environment 100 may include one or more clients 110, 120. Clients 110, 120 may be operated by one or more entities that produce various records and data such as, for example, financial and investment institutions (e.g., banks, hedge funds, insurance companies), government agencies (e.g., prosecutorial agencies, law enforcement agencies, national security agencies, transportation authorities, agriculture and drug tracking administrations), non-profit organizations, educational institutions, corporations, research groups, healthcare providers, etc. By way of example, client 110, 120 may include smartphones, tablets, netbooks, electronic readers, personal digital assistants, personal computers, laptop computers, desktop computers, large display devices, servers, server farms, and/or other types of electronics or communication devices. In some embodiments, client 110, 120 may be implemented with hardware devices and/or software applications running thereon. In embodiments, client 110, 120 may be configured to communicate to and/or through network 150 with other clients and components, such as data importer 130 and database 140, and vice-versa. Also, in some embodiments, client 110, 120 may implement aspects of the present disclosure without the need for accessing another device, component, or network, such as network 150.

Network 150 may include any combination of communications networks. For example, network 150 may include the Internet and/or any type of wide area network, an intranet, a metropolitan area network, a local area network (LAN), a wireless network, a cellular communications network, etc. In some embodiments, client 110, 120 may be configured to transmit data and information through network 150 to an appropriate data importer, such as, for example, data importer 130. For example, client 110, 120 may be configured to transmit electronic data files including various types of content to data importer 130. In some aspects, client 110, 120 may also be configured to receive information from data importer 130 through network 150.

Data importer 130 may be configured to communicate and interact with clients 110, 120, and database 140. In certain embodiments, data importer 130 may be standalone system or apparatus, or it may be part of a subsystem, which may be part of a larger system. For example, data importer 130 may represent a distributed system that includes remotely located sub-system components that communicate over a communications medium (e.g., network 150) or over a dedicated network, for example, a LAN.

In some embodiments, data importer 130 may be configured to receive data and information through network 150 from various devices and systems, such as, for example, clients 110, 120. For example, data importer 130 may be configured to receive electronic data files including various types of content from clients 110, 120, and other devices and systems. The content may include, for example, text information, data, images, etc. Data importer 130 may be configured to import data included in the received electronic data files into one or more databases, such as database 140 and 170, and/or into one or more data analysis systems, such as data analyzer 150 and 160.

Database 140 and 170 may include one or more logically and/or physically separate databases configured to store data. The data stored in database 140 and 170 may be received from data importer 130, from client 110, 120 (directly and/or through a data analysis system) and/or may be provided as input using conventional methods (e.g., data entry, data transfer, data uploading, etc.). The data stored in the database 140 and 170 may take or represent various forms including, but not limited to, electronic data files in the form of presentations, textual content, and spreadsheets; transformation templates, file type profiles for various electronic data file types, user profile information, and a variety of other electronic data or any combination thereof. In some embodiments, database 140 and 170 includes a database that stores electronic data files, a database that stores transformation templates, and a database that stores file type profiles. In still some other embodiments, the databases that store electronic data files, transformation templates, and file type profiles can be combined into various combinations. In still some other embodiments, database 140 and 170 includes a single database that stores electronic data files, transformation templates, and file type profiles.

In some embodiments, database 140 and 170 may be implemented using any suitable form of a computer-readable storage medium. In some embodiments, database 140 and 170 may be maintained in a network attached storage device, in a storage area network, or combinations thereof, etc. Furthermore, database 140 and 170 may be maintained and queried using numerous types of database software and programming languages, for example, SQL, MySQL, IBM DB2®, Microsoft Access®, PERL, C/C++, Java®, Cassandra, etc. Although FIG. 1A shows database 140 and 170 170 associated with data importer 130 and data analyzer 150 and 160, database 140 and/or 170 may be a standalone database that is accessible via network 150, database 140 and/or 170 may be included in data importer 130 or a data analysis platform (e.g., data analyzer 150 and 160), or database 140 and/or 170 may be associated with or provided as part of a system or environment that may be accessible to client 110, 120 and/or other components.

FIG. 1B, illustrates another embodiment of system environment 100. The embodiment of system environment 100 shown in FIG. 1B is similar to the embodiment of system environment 100 shown in FIG. 1A, except that data analyzer 150 and 160 are connected to one or more clients 190 and 191 via a network 180. Client 190 and 191 may communicate with data analyzer 150 and 160 through network 180 to access and use data imported by data importer 130. Client 190 and 191 and network 180 may be implemented using hardware and/or software similar to those used to implement clients 110 and 120, and network 150, respectively.

FIG. 2A-2D are block diagrams illustrating example embodiments of data importer 130 for implementing embodiments and aspects of the present disclosure. The arrangement and number of components included in the embodiments of data importer 130 shown in FIG. 2A-2D is provided for purposes of illustration. Additional arrangements, number of components, and other modifications may be made, consistent with the present disclosure.

Figure 2A:
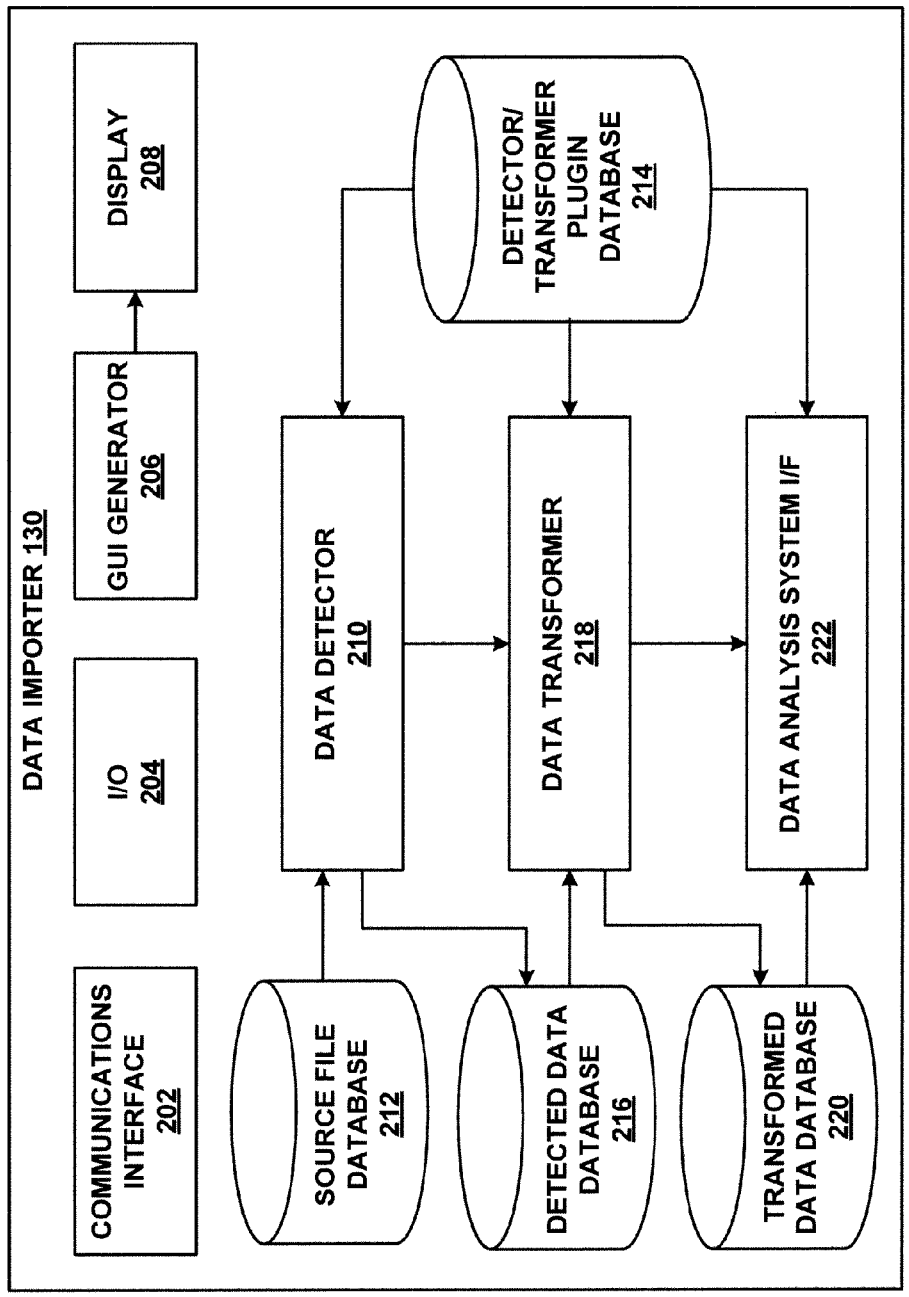
FIG. 2A-2D are block diagrams of example embodiments of a data importer for importing data from electronic data files, consistent with embodiments of the present disclosure.

As shown in FIG. 2A, one embodiment of data importer 130 may include one or more communications interfaces 202. Communications interface 202 may allow data and/or information to be transferred between data importer 130 and network 150, client 110, 120, database 140 and 170, and/or other components. For example, communications interface 202 may be configured to receive source electronic data files that include content. Some non-limiting examples of electronic data files include spreadsheets, .csv files. .tsv files, XML files, JSON files, emails (e.g., .pst files, .mbox files, .eml files), PDF files, Word documents, plain .txt files, social media warrant returns, subpoenaed social media records, IP logs from service providers, subpoenaed cell phone records, litigation document productions (e.g., images and extracted text files), media files (image files, sound files, video files), PowerPoint presentations, archived and compressed files (e.g., ZIP files, 7z files, cab files, RAR files, etc.), database files, PUB files, specialized tax and financial files (e.g., Open Financial Exchange and Interactive Financial Exchange files), webpage files (e.g., HTML files), and data streams (e.g., input streams, output streams). The received source electronic data files may include various types of content. For example, the received source electronic data files may include data associated with the operators of client 110, 120. Example types of data include brokerage account data, wire transfer bank transaction data, surveillance data, law enforcement data, telecommunications data, sales data, manufacturing data, etc.

Examples of communications interface 202 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 202 may receive data and information in the form of signals, which may be electronic, electromagnetic, optical, or other signals capable of being received by communications interface 202. These signals may be provided to communications interface 202 via a communications path (not shown), which may be implemented using wireless, wire, cable, fiber optics, radio frequency ("RF") link, and/or other communications channels.

Database importer 130 may also include one or more input/output (I/O) devices 204. I/O 204 may provide users with the capability to input data and instructions to data importer 130 and various components of data importer 130. By way of example, I/O 204 may include physical keyboards, virtual touch-screen keyboards, mice, joysticks, styluses, etc.

Data importer 130 may also include one or more source file databases 212. Source file database 212 may be configured to store source electronic data files received by data importer 130 at communications interface 202. Source file database 212 may also be configured to receive and store source electronic data files received in response to input received from a user and any associated properties that the user may input with regards to the uploaded file. For example, data importer 130 may provide an interactive importer graphical user interface (GUI) that allows a user to select local source electronic data files, folders of source electronic data files, and/or groups of source electronic data files to be uploaded to source file database 212 and may prompt the user to complete one or more form fields associated with the files to be uploaded. The importer GUI may also allow the user to specify one or more data analysis systems and/or databases to which transformed electronic data files will be sent. Alternatively, the data analysis systems or databases can be set via a data importer 130 configuration file.

Data importer 130 may include a graphical user interface (GUI) generator 206 that generates the importer GUI for display on a display 208. The importer GUI may display the source electronic data files stored in file database 212, real-time status updates associated with the stored files (e.g., file type detected, file type not detected, file transformation pending, file transformation in process, file transformation complete, transformed file provided to one or more data analysis systems or databases, etc.), and any metadata associated with the stored source electronic data files. In some embodiments, stored source electronic data files may be assigned to one or more case files such as legal proceedings (e.g., a lawsuit), legal processes (e.g., a warrant, court order, or subpoena), or investigations (e.g., a civil or criminal investigation). Users may be assigned limited rights such that they may only view, modify, or upload source electronic data files to certain case files. In addition, the access permissions assigned to each user may be provided to the data analysis systems or databases to which imported electronic data are sent, thereby limiting users' access in the data analysis systems or databases to imported data to only which they have been given access.

Data importer 130 may assign metadata to electronic data files that are stored in file database 220. Metadata may be assigned at the electronic data file level and/or case file level. For example, a user may instruct data importer 130 to assign metadata to each uploaded file individually or to groups of uploaded files. As another example, the user may instruct data importer 130 to assign metadata to all source electronic files uploaded to a given case file. Moreover, data importer 130 may automatically assign metadata to all source electronic data files uploaded to a given case file. For example, data importer 130 may automatically assign metadata specifying the legal proceeding, legal process, or investigation name, Bates number, production number, case number, user name, source name, etc., to each source electronic data file. Other metadata may include date the electronic data file was stored, date transformed, file name, file type, etc.

Data importer 130 may include a data detector 210 that detects file types associated with source electronic data files (or groups of source electronic data files) stored in source file database 212. In some embodiments, data detector 210 may automatically detect file types in response to the user uploading the source electronic data file(s) to source file database 212 via the importer GUI.

A file type may be defined by the file format of a source electronic data file and the content included in therein. Electronic data files may include spreadsheets, .csv files, .tsv files, XML files, JSON files, emails (.pst files, .mbox files, .eml files), PDF files, Word documents, plain .txt files, social media warrant returns or subpoenaed social media records, IP logs from service providers (such as email service providers, internet service providers), subpoenaed cell phone records, litigation document productions (e.g., images, extracted text files), media files (image files, sound files, video files), PowerPoint presentations, archived and compressed files (e.g., ZIP files, 7z files, cab files, RAR files, etc.), database files, PUB files, specialized tax and financial files (e.g., Open Financial Exchange and Interactive Financial Exchange files), webpage files (e.g., HTML files), and data streams (e.g., input streams, output streams). Examples of electronic data file types include "U.S. Bank wire transfer transaction spreadsheet data," "China Telecom telephone text document call records," "AAA Brokerage Monthly Statement CSV data," "ABC Corporation xyz product line sales database records," etc. Data detector 210 may also detect a version of the file type and changes in file type versions. For example, a "China Telecom telephone text document call records" may have various versions that have differences in layout, data content, etc.

Data detector 210 may detect file types or groups of file types using detector/transformer plugins. Each detector/transformer plugin is associated with a unique file type and includes a detector and transformer pair. The detector detects the file type associated with a source electronic data file and determines whether the transformer paired with the detector is capable of transforming the detected file type into a format such that the data included in the transformed file is capable of being imported into one or more data analysis systems and/or databases.

To detect file types, data detector 210 may obtain a source electronic data file from source file database 212 and loads or executes one or more detectors in the detector/transformer plugins from detector/transformer plugin database 214. Data detector 210 may compare the file type of the source electronic data file with each detector from a detector/transformer plugin or data detector 210 executes each detector from a detector/transformer plugin with the file type of the source electronic data file as input to determine whether one or more of the detector/transformer plugins apply (i.e., the source electronic data file is a file type capable of being transformed by the detector/transformer plugin).

Data detector 210 may load or execute a detector/transformer plugin's detector to detect source electronic data file types using various methods and techniques. One file type detection technique may include analyzing properties of each electronic data file and comparing the analyzed properties to properties associated with known file types. Properties used to detect an electronic file type include, for example, file format (e.g., spreadsheet, CSV file, database file, text file, etc.), file name (e.g., file name extensions), metadata (e.g., file header, MIME types, uniform type identifier, file format identifier), and structure of the file (e.g., names of the sheets or data fields in a spreadsheet file, schema of tables and columns in a database file, structure of data and information represented in an XML file or a JSON file). Data fields may define different categories of data included in a source electronic data file. For example, data fields in a wire transfer bank transaction spreadsheet may be columns that include data and a header such as "Transfer To," "Transfer From," "Transfer Amount," and "Transaction Date" for each wire transfer transaction.

The detector for a detector/transformer plugin may store a list of properties associated with a given file type. The detector may use the properties to detect file types of source electronic data files. For example, a detector/transformer plugin for a "U.S. Bank wire transfer transaction spreadsheet data" file type may include a file format (e.g., .xls file), a name of a specific tab within the file (e.g., "Account Exports"), and a string of text at a specific location in the file as properties that identify the file type. The name of the tab and string of text may be common between all electronic data files of a "U.S. Bank wire transfer transaction spreadsheet data" file type received by data importer 130. For example, all electronic files of a "U.S. Bank wire transfer transaction spreadsheet data" file type may include a tab named "Account Exports" and have a text string "U.S. Bank wire transfer transaction data" as the first string of text included in the file (or, e.g., located at a specific column/row location). Accordingly, data detector 210 may detect a "U.S. Bank wire transfer transaction spreadsheet data" file type for all source electronic data files of a .xls file format that include a tab named "Account Exports" and the text string "U.S. Bank wire transfer transaction data" as the first string in the file. In order to compare strings of text included in source electronic data files to strings of text included in file type profiles, detector may parse the information included in a source electronic data file to identify one or more words or phrases.

In some embodiments, source electronic data files may be associated with multiple file types. For example, a spreadsheet file may have multiple tabs or sheets within the file that contain different data and therefore can each be associated with a different file type. As an example, a spreadsheet file may include an "Account Ownership" tab that includes information relating to ownership of bank accounts for a given bank and a "Transaction Data" tab that includes data relating to banking transactions associated with the accounts included in the "Account Ownership" tab. Detector/transformer plugin database 214 may include a plurality of detector/transformer plugins and each detector/transformer plugin detects file types for a tab included in the spreadsheet. Accordingly, each tab in the spreadsheet can be detected and transformed differently based on the file types associated with those tabs.

In some embodiments, source electronic data files may be compressed or grouped together as a single file. For example, a source electronic data file may be a compressed .zip file containing one or more electronic data files. In some embodiments, data detector 210 may uncompress the .zip file into one or more individual electronic data files. In some embodiments, data detector 210 may store the one or more individual electronic data files in source file database 212. In some embodiments, data detector 210 may load or execute a detector/transformer plugin's detector to detect file types of the individual electronic data files.

Detector/transformer plugins may be maintained in detector/transformer plugin database 214 by one or more users (e.g., using I/O 204 and the importer GUI). Users may upload detector/transformer plugins to detector/transformer plugin database 214, modify detector/transformer plugins in detector/transformer plugin database 214, and delete detector/transformer plugins from detector/transformer plugin database 214. For example, a user may modify a detector/transformer plugin by changing its priority. A detector/transformer plugin's priority may dictate the order in which data detector 210 compares detector/transformer plugins to a given source electronic data file. For example, higher priority plugins may be loaded or executed by data detector 210 before lower priority plugins. A detector/transformer plugin's priority may also dictate whether data detector 210 loads or executes the detector of a detector/transformer plugin to a given source electronic data file. For example, data detector 210 may only load or execute detectors of detector/transformer plugins to a given source electronic data file that meet or exceed a priority threshold. Moreover, a detector/transformer plugin's priority may be used to resolve conflicts wherein multiple detector/transformer plugins' transformers are capable of transforming a source electronic data file. For example, a higher priority plugin may be applied to a source electronic data file over a lower priority plugin where both plugins' transformers are capable of transforming the source electronic data file.

In some embodiments, data detector 210 may load or execute detector/transform plugins' detectors with groups of files, e.g., a plurality of files, a folder containing one or more files and zero or more subfolders, or a compressed file containing one or more files. A group of files may be treated by data importer 130 (and its components) as a single entity. For example, a group of files may be treated as a locked unit of files that cannot be separated into its constituent files, individually renamed, modified, or deleted. In one example, data importer 130 may lock a group of files after the data importer 130 has processed (e.g., detected, transformed, imported) the group of files. Thus, detector/transformer plugins configured to detect file types of groups of files are capable of processing the group as a singular entity. Accordingly, when a user desires to modify, process, or delete a file included in a group, the entire group must be modified, processed, or deleted.

When data detector 210 determines that a detector has successfully detected that its associated transformer is compatible with a file type of the source data file, data detector 210 creates a detected version of the source data file (or group of source data files) and stores the detected version in detected data database 216. Data detector 210 annotates the detected version of the source electronic data file with the corresponding detector/transformer plugin (e.g., storing identifying information regarding the corresponding detector/transformer plugin in metadata associated with the detected version of the source electronic data file). The user may also add metadata to detected versions of the source electronic data files.

Data importer 130 may include a data transformer 218 that transforms detected versions of source electronic data files. Data transformer 218 may obtain the detected versions of the source electronic data files from detected data database 216 and load or run the transformer of the corresponding detector/transformer plugin to create one or more transformed electronic data files. In some embodiments, the transformer may provide the required configuration for creating the one or more transformed electronic data files. In some embodiments, the transformer may receive from data importer 130 or load the required configuration for creating the one or more transformed electronic data files. Data transformer 218 may provide various visual indicators on the data importer GUI that indicate transformation is in process, transformation was successful, or an error occurred during transformation. In some embodiments, data transformer 218 may automatically perform transformations in response to detected versions of source electronic data files being stored in detected data database 216. In some other embodiments, data transformer 218 may perform the transformations in response to receiving instructions from the user.

Data transformer 218 may load or execute a detector/transformer plugin's transformer to transform detected source electronic data file types using various methods and techniques. The transformer may transform the data into one or more formats, such as comma-separated values, tab separated values, XML, JSON, or the source electronic data file type(s). The transformer may also store, copy, or keep the data as is when creating the transformed electronic data file.

Data transformer 218 may update the metadata associated with the detected version of the source electronic data file once the one or more transformed electronic data files have been created (i.e., to indicate that the one or more transformed files have been processed). Data transformer 218 may also store the transformed electronic data files in transformed data database 220. In some embodiments, data transformer 218 may store information regarding the transformation process (e.g., date of transformation, time of transformation, user who initiated the transformation) in transformed data database 220.

Data importer 130 may include a data analysis system interface (I/F) 222 that imports data from the transformed electronic data files to one or more data analysis systems (e.g., data analyzer 150 and 160) and/or databases (e.g., database 140 and 170). Data analysis system interface (I/F) 222 may provide a visual indicator on the importer GUI that indicates whether importation was successful or an error occurred during importation. In some embodiments, data analysis system I/F 222 may store transformed electronic data files to a database or file system external to data importer 130, e.g., network server. In some embodiments, data analysis system I/F 222 may stream the transformed data to a data analysis system or database.

As an example implementation, data transformer 218 may transform multiple email files (e.g., .msg files) to a single .csv file. The resulting .csv file may contain the values for sender, recipient, date, cc recipients, bcc recipients, message body, etc. from each email file. Data transformer 218 may store the transformed data in transformed data database 220. Data analysis system I/F 222 may import the resulting .csv file into a SQL database or another type of database (e.g., database 140).

As another example, data transformer 218 may transform a spreadsheet file (e.g., .xlsx file) including telephone call information to one or more files in .xml format that is compatible with a data analysis system, e.g., data analyzer 160. Each resulting .xml file may include information associated with each an individual call from the spreadsheet file. Data transformer 218 may store the transformed data in data database 220. Data analysis I/F 222 may import the .xml file(s) into a data analysis system, e.g., data analyzer 160.

As a further example, data transformer 218 may transform service provider logs stored in a text file (i.e., .txt file format) including username, IP address, date, time, etc. to one or more files in JSON format. Data transformer 218 may store the information regarding the transformation in data database 220. Data transformer 218 may provide the transformed data to data analysis system I/F 222 to stream the transformed data into a data analysis platform.

GUI generator 280, data detector 210, data transformer 218, and data analysis system I/F 222 may be implemented as one or more hardware modules configured to execute the functions described herein. Alternatively, one or more processors suitable for the execution of instructions may be configured to execute the functions of GUI generator 280, data detector 210, data transformer 218, and data analysis system I/F 222. For example, suitable processors include both general and special purpose microprocessors, programmable logic devices, field programmable gate arrays, specialized circuits, and any one or more processors of any kind of digital computer that may be communicatively coupled to a physical memory (not shown) storing file GUI generator 280, data detector 210, data transformer 218, and data analysis system I/F 222 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of GUI generator 280, data detector 210, data transformer 218, and data analysis system I/F 222 may be included in the processor itself such that the processor is configured to implement these functions.

While source file database 212, detector/transformer plugin database 214, detected data database 216, and transformed data database 220 are shown to be included in data importer 130, one or more of databases 212, 214, 216, and 220 may be included in the same database. In some embodiments, one or more of databases 212, 214, 216, and 220 may be included in separate databases. In some embodiments, one or more of databases 212, 214, 216, and 220 may be implemented by a file system.

Display 208 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

Figure 2B:
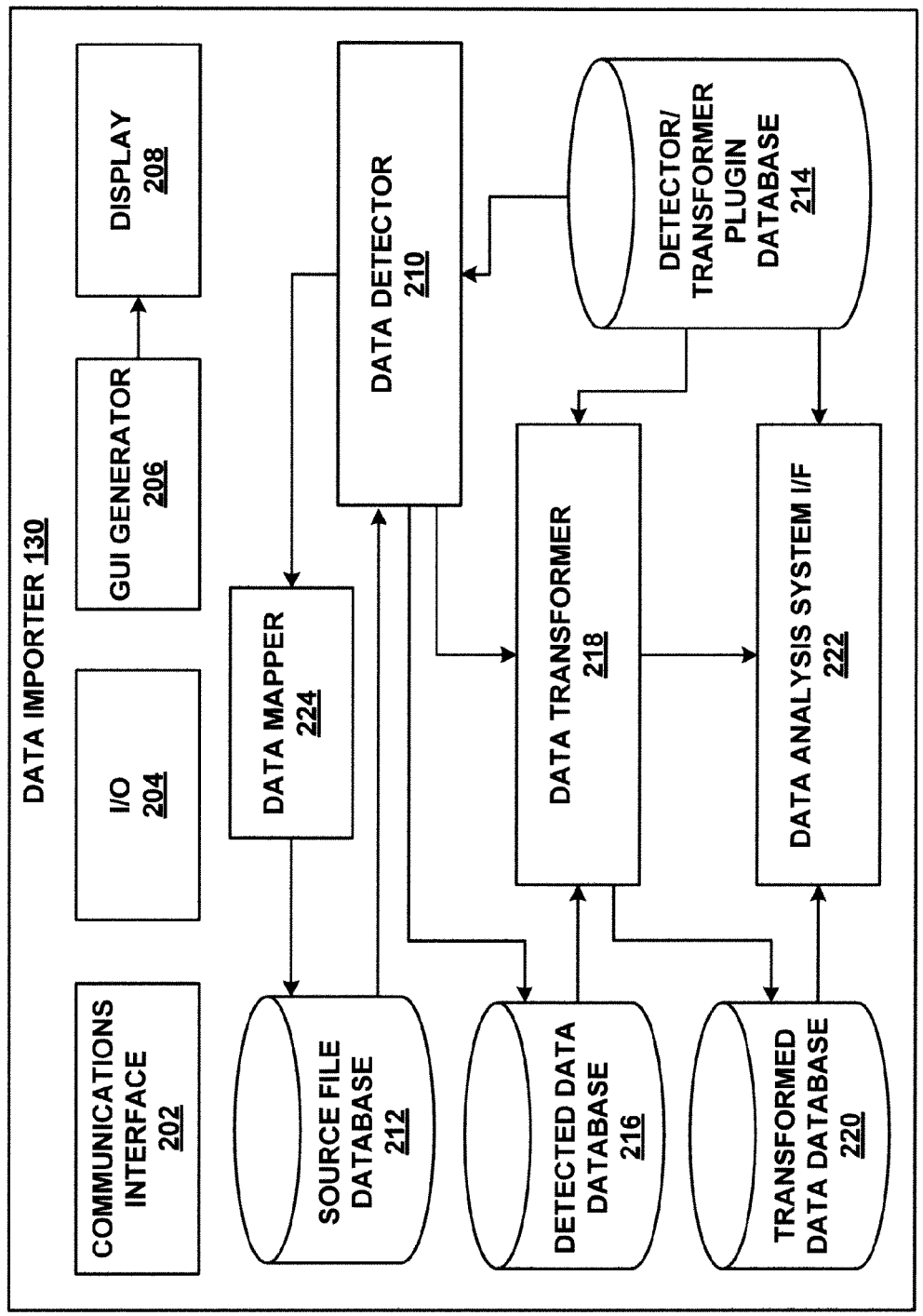

FIG. 2B, illustrates another embodiment of data importer 130. The embodiment of data importer 130 shown in FIG. 2B is similar to the embodiment of data importer 130 shown in FIG. 2A, except that data importer 130 includes a data mapper 224. When data detector 210 determines that a detector/transformer plugin applies to a file type that data mapper 224 is able to, data detector 210 may send a request to data mapper 224 to generate an interactive mapping GUI.

The mapping GUI may allow the user to perform a workflow for mapping the format of the source electronic data file to a canonical format included in a transformation template so that the data can be detected by data detector 210 and/or transformed by data transformer 218. Once the workflow is completed and the format of the source electronic data file has been mapped to a canonical format, data mapper 224 may store the mapped version of the source electronic data file in source file database 212 and may include metadata copied from the original source electronic data file. In some embodiments, data mapper 224 may store the mapped version of the source electronic data file in detected data database 216 or transformed data database 220.

Data detector 210 may obtain the mapped version of the source electronic data file from source file database 212 and may load or execute the detectors in the detector/transformer plugins from detector/transformer plugin database 214. Data detector 210 may compare the file type of the mapped source electronic data file with each detector/transformer plugin's detector to determine whether one of the detector/transformer plugins' transformers applies to the mapped source electronic data file.

Data mapper 224 may be implemented as a hardware modules configured to execute the functions described herein. Alternatively, one or more processors suitable for the execution of instructions may be configured to execute the functions of data mapper 224. As another example, the functions of data mapper 224 may be included in the processor itself such that the processor is configured to implement these functions.

Figure 2C:
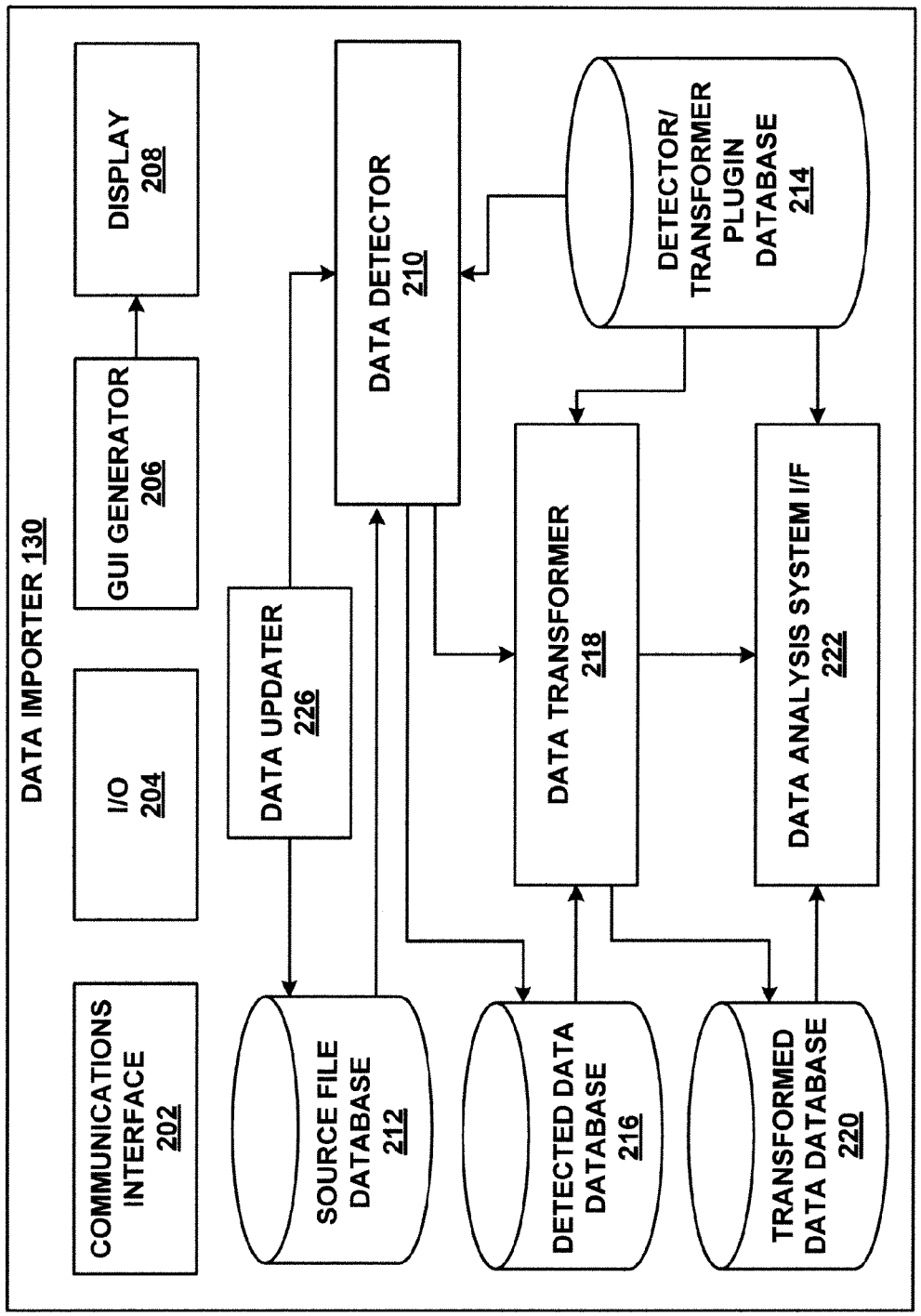

FIG. 2C, illustrates another embodiment of data importer 130. The embodiment of data importer 130 shown in FIG. 2C is similar to the embodiment of data importer 130 shown in FIG. 2A, except that data importer 130 includes a data updater 226. In some embodiments, data updater 226 may receive requests from users to update electronic data files via the interactive GUI. In some embodiments, a user may provide instructions to data updater 226 (e.g., in the form of input via I/O 204) to modify, update, or change source electronic data files stored source file database 212. For example, a user may modify a source electronic data file stored in source file database and desire to provide the updates to one or more data analysis systems (e.g., data analyzer 150 and 160) and/or databases (e.g., database 140 and 170) that received transformed data from the original source electronic data file.

In some embodiments, data updater 226 may replace a source file in the source file database 212 with a replacement file (e.g., blank text file, a Microsoft Word file) and may include metadata associated with the update (e.g., requester name, data of request, case file identifier, etc.). For example, a user using a data analysis system to perform document review as part of discovery in an ongoing litigation may need to replace clawed back original source electronic data files from data importer 130 and data analysis system with a replacement file (e.g., a redacted version of the file, a text file that indicates that the original source electronic data file had been clawed back). Data detector 210 may load or execute one or more detector/transformer plugins' detectors that detect the replacement file, and stores a detected version of the replacement file in the detected data database 216 and may include metadata associated with the update. Data transformer 218 may obtain the detected version of the replacement file from detected data database 216 and load or run the transformer of the corresponding detector/transformer plugin to create one or more transformed electronic data files. Data importer 130 may include a data analysis system interface (I/F) 222 that imports data from the transformed electronic data files to one or more data analysis systems (e.g., data analyzer 150 and 160) and/or databases (e.g., database 140 and 170). In some embodiments, data analysis systems and/or databases replace the transformed data from the original source electronic data file. In some embodiments, data analysis systems and/or database may retain the transformed data from the original source electronic data file and import the transformed data from the replacement file.

In some embodiments, data updater 226 may receive requests to update electronic data files from one or more data analysis systems (e.g., data analyzer 150 and 160). For example, a user using a data analysis system to perform document review as part of discovery in an ongoing litigation may provide requests to the data analysis system to add various tags (e.g., relevant, not relevant, privileged, not privileged, etc.) to one or more source electronic data files. The data analysis system may send a request to data updater 226 to update the metadata of a source electronic data file with the one or more assigned tags. Data updater 226 may perform the update and store the updated source electronic data file in source file database 212 so that data detector 210 and data transformer 218 may transform the updated source electronic data file using a detector/transformer plugin. The updated transformed data may be provided to all of the data analysis systems and databases that received the original transformed data, thereby maintaining consistency among transformed data users.

Data updater 226 may be implemented as a hardware modules configured to execute the functions described herein. Alternatively, one or more processors suitable for the execution of instructions may be configured to execute the functions of data updater 226. As another example, the functions of data updater 226 may be included in the processor itself such that the processor is configured to implement these functions.

Figure 2D:
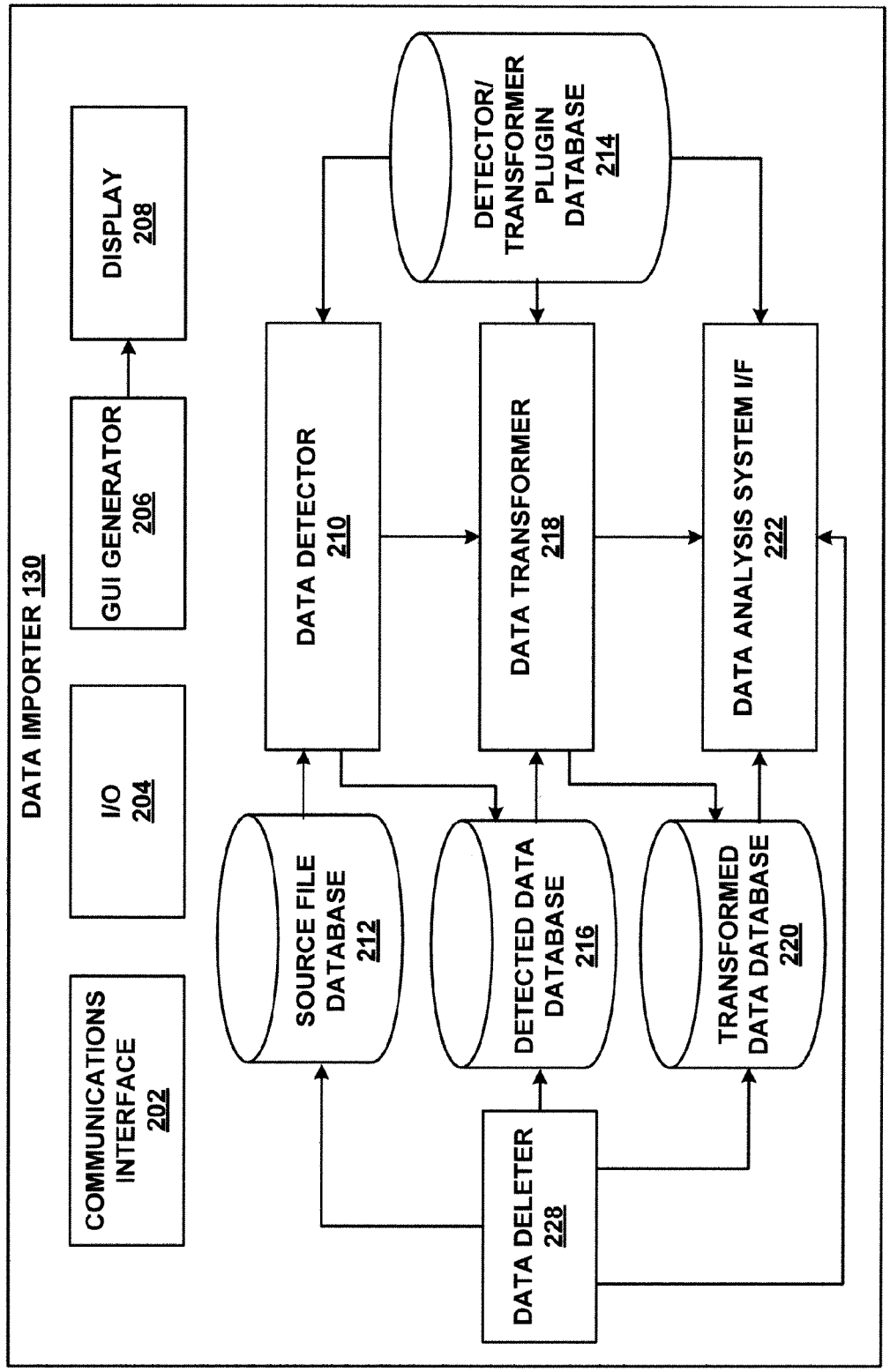

FIG. 2D, illustrates another embodiment of data importer 130. The embodiment of data importer 130 shown in FIG. 2D is similar to the embodiment of data importer 130 shown in FIG. 2A, except that data importer 130 includes a data deleter 228. Data deleter 228 may receive requests from users to delete electronic data files via the interactive GUI. In some embodiments, a user may provide instructions to data deleter 228 (e.g., in the form of input via I/O 240) to delete a source electronic data file from source file database 212. Data deleter 228 may delete the source electronic data file in response to the instructions and also delete any detected and transformed electronic data files respectively stored in detected data database 216 and transformed data database 220 that are associated with the deleted source electronic data file. Moreover, data deleter 228 may provide instructions via data analysis system I/F 222 to any data analysis systems and/or databases that received associated transformed electronic data files to delete the received transformed electronic data files. Accordingly, data importer 130 may perform source file management to ensure electronic data files are maintained consistently across multiple platforms. Data deleter 228 may be implemented as a hardware modules configured to execute the functions described herein. Alternatively, one or more processors suitable for the execution of instructions may be configured to execute the functions of data deleter 228. As another example, the functions of data deleter 228 may be included in the processor itself such that the processor is configured to implement these functions.

Figure 3:
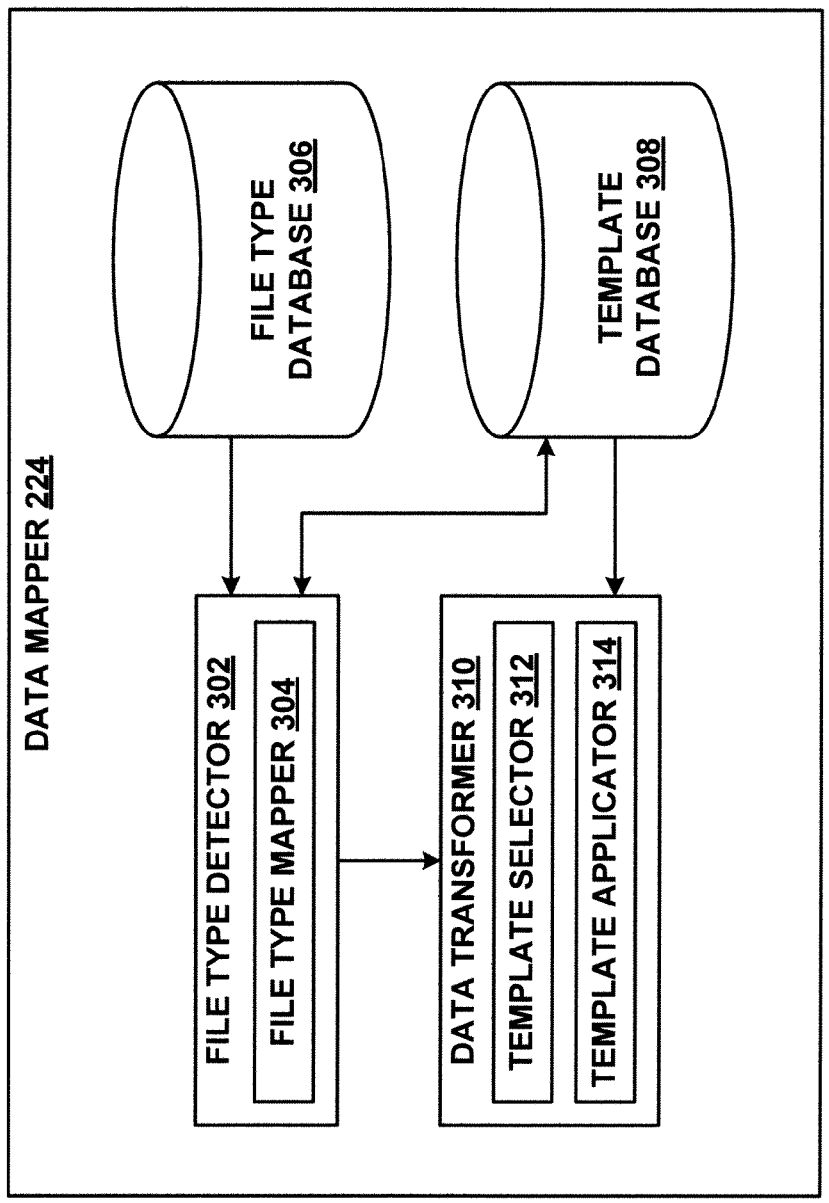
FIG. 3 is a block diagram of an example data mapper, consistent with embodiments of the present disclosure.

FIG. 3 illustrates an example embodiment of a data mapper 224, consistent with embodiments and aspects of the present disclosure. As shown in FIG. 3, data mapper 224 includes a number of components. It will be appreciated from this disclosure, however, that the number and arrangement of these components is exemplary only and provided for purposes of illustration. Other arrangements and numbers of components may be utilized without departing from the teachings and embodiments of the present disclosure.

Data mapper 224 may include one or more file type detectors 302 that may detect file types associated with source electronic data files received from data detector 210. File type detector 302 may automatically detect file types associated with source electronic data files received from data detector 210 or in response to input received from a user (e.g., instructions received via I/O 204). The received instructions may include instructions to perform file type detection on one or more source electronic data files included in source file database 212. GUI generator 280 may generate a graphical display of one or more hyperlinks for data importation on the interactive GUI. The hyperlink, when interacted with by a user, may provide instructions to file type detector 302 for performing file type detection.

File type detector 302 may detect source electronic data file types using various methods and techniques. One file type detection technique may include analyzing properties of each electronic data file and comparing the analyzed properties to properties associated with known file types. Properties used to detect an electronic file type include, for example, file format (e.g., spreadsheet, CSV file, database file, text file, etc.), file name, and structure of the file (e.g., names of the sheets or data fields in a spreadsheet file, schema of tables and columns in a database file, structure of data and information represented in an XML file). Data fields may define different categories of data included in a source electronic data file. For example, data fields in a wire transfer bank transaction spreadsheet may be columns that include data and a header such as "Transfer To," "Transfer From," "Transfer Amount," and "Transaction Date" for each wire transfer transaction.

Known file types may be stored in file type profiles in a file type database 306. File type profiles may include a list of properties associated with a given file type. The properties included in each file type profile can be used by file type detector 302 to detect file types of source electronic data files. For example, a file type profile associated with a "U.S. Bank wire transfer transaction spreadsheet data" file type may include a file format (e.g., .xls file), a name of a specific tab within the file (e.g., "Account Exports"), and a string of text at a specific location in the file as properties that identify the file type. The name of the tab and string of text may be common between all electronic data files of a "U.S. Bank wire transfer transaction spreadsheet data" file type received by data importer 130. For example, all electronic files of a "U.S. Bank wire transfer transaction spreadsheet data" file type may include a tab named "Account Exports" and have a text string "U.S. Bank wire transfer transaction data" as the first string of text included in the file (or, e.g., located at a specific column/row location). Accordingly, file type detector 302 may detect a "U.S. Bank wire transfer transaction spreadsheet data" file type for all source electronic data files of a .xls file format that include a tab named "Account Exports" and the text string "U.S. Bank wire transfer transaction data" as the first string in the file. In order to compare strings of text included in source electronic data files to strings of text included in file type profiles, file type detector 230 may parse the information included in a source electronic data file to identify one or more words or phrases.

In some embodiments, file type detector 302 may compare the identified properties of each source electronic data file with the properties included in each file type profile stored in file type database 306. If the identified properties of a source electronic data file do not match the properties included in a file type profile, file type detector 302 may continue to the next file type profile until it finds a matching profile or until all of the file type profiles stored in file type database 306 have been compared.

In some embodiments, source electronic data files may be associated with multiple file types. For example, a spreadsheet file may have multiple tabs or sheets within the file that contain different data and therefore can each be associated with a different file type. As an example, a spreadsheet file may include an "Account Ownership" tab that includes information relating to ownership of bank accounts for a given bank and a "Transaction Data" tab that includes data relating to banking transactions associated with the accounts included in the "Account Ownership" tab. Data mapper 224 may include a plurality of file type detectors 302 that each detect file types for a tab included in the spreadsheet. Accordingly, each tab in the spreadsheet can be detected and transformed differently based on the file types associated with those tabs.

In some embodiments, file type detector 302 may provide an indicator that file type detector 302 is unable to detect a file type for a source electronic data file. The indicator may take on various forms. For example, the indicator may be implemented as a visual indicator that is generated by GUI generator 280. The visual indicator may be, for example, a pop-up text box, a flag, an email message, an error report, or any visual indicators known in the art and combinations thereof. The visual indicator may notify a user that additional information is required in order for file type detector 302 to detect a file type of the source electronic data file. In some embodiments, the visual indicator may be a passive indicator that informs the user/administrator of the error and the source electronic data file associated with the error. In some embodiments, the visual indicator may be an interactive indicator that the user can interact with via I/O 204. For example, when the file type detector 302 is able to detect a file type for a source electronic data file, an interactive indicator may be implemented as a hyperlink that causes GUI generator 280 to generate a graphical display of a file type mapper 304 in response to a user interaction with the indicator.

In some embodiments, file type mapper 304 may generate new file type profiles. New file type profiles may be generated for source electronic data files with unknown file types (e.g., files types that could not be detected by file type detector 302). A user may select a source electronic data file for generating a new file type profile, for example, by interacting with the visual indicator associated with that source electronic data file as described above. File type mapper 304 may display an interactive interface for receiving various properties of the selected source electronic data file in the form of user input. In some embodiments, the interface may include an option for a user to identify a file format for the source electronic data file. For example, the interface may include a list of file formats (e.g., in the form of a drop-down box or a list of check boxes), and the user may input selection of the file format (e.g., .csv, spreadsheet, .tsv, etc.) for the selected source electronic data file via I/O 204. In some embodiments, however, file type detector 302 may detect the file format of the selected source electronic data file and file type mapper 304 may display the detected file format to the user. The user may override the detected file format by selecting a different file format via I/O 204.

In some embodiments, the interface may include an option for a user to identify content included in the source electronic data file that can be used by file type detector 302 to identify the file type (i.e., that can be used as an identifier of the file type). For example, file type mapper 304 may display a portion of the content (e.g., the first five rows of a .csv file) on the interface and may prompt the user to select the content that can be used to identify the file type. For example, the source electronic data file may include a combination of data fields (e.g., "transfer to," "transfer from," "transfer amount," etc.) that are unique to the file type, and the user may select those data fields via I/O 204. Other non-limiting examples, of content that may be used to identify a file type include headings (e.g., "U.S. Bank wire transfer transaction data"), descriptions (e.g., "This file includes China Telecom telephone call records"), arrangements of data fields (e.g., "transfer amount" is presented first followed by "transfer to" and "transfer from"), data provider codes (e.g., codes that are specific to the provider of the electronic data files), structure of the file (e.g., names of the sheets or data fields in a spreadsheet file, schema of tables and columns in a database file, structure of data and information represented in an XML file), etc.

In some embodiments, once file type mapper 304 has received the file format of the source electronic data file and selection of the identifier content, file type mapper 304 may display an interface for receiving file type mappings. The file type mappings may be used to transform the data included in the source electronic data file to conform to or match a transformation template, thereby generating a transformed electronic data file. A transformation template may include, for example, a canonical format for data fields and data associated with a given data type. A canonical format may define, for example, the types of data fields, arrangement and content of data fields, format of the data included in each data field, etc.

One example of a file type mapping may include a tabular canonical format. The tabular canonical format may transform data stored in a .csv or .tsv file, into a tabular format. In order to transform the source .csv data into a tabular format, a user may provide input to file type mapper 304 to identify column headers and a delimiter (e.g., comma, semicolon, etc.) that separates data fields in the .csv file. File type mapper 304 may process the .csv file by identifying the column headers and building columns and rows with the data stored in the source .csv file using the identified delimiter as the boundary between data fields. Another example of a file type mapping including a tabular canonical format may transform an XML tree structure into rows and columns of a tabular data structure. A user may, for example by providing input to file type mapper 304, identify which tree elements are to be assigned to rows of the tabular data structure and which sub-elements are to be assigned to columns of the tabular data. As an example, a user may specify, through file type mapper 304, that each <book> element in an XML tree is to be assigned to rows and properties of the book (e.g., <title>, <author>, <publication year>, etc.) are to be assigned to columns.

In some embodiments, in order to receive file type mappings from the user, file type mapper 304 may display an option for the user to assign a transformation template to the file type of the source electronic data file. For example, file type mapper 304 may obtain transformation templates from a template database 308. In some embodiments, file type mapper 304 may display all the transformation templates stored in template database 308. In some embodiments, however, file type mapper 304 may display only a portion of the transformation templates stored in template database 308. For example, file type mapper 304 may display a portion of the transformation templates based on the file format of the electronic data file, based on the provider of the electronic data file, etc. Display of the transformation templates may include a list of transformation templates (e.g., in the form of a drop-down box or a list of check boxes), and the user may input selection of the transformation template for the file type profile via I/O 204.

File type mapper 304 may display a list of canonical data fields associated with the transformation template. For example, the display may include a list of canonical data fields required by the selected transformation template (i.e., the minimum data fields required for the format of an electronic data file to be successfully transformed to the format of the transformation template), a list of optional canonical data fields associated with selected transformation template, or a combination of required and optional canonical data fields. In some embodiments, when a combination of required and optional canonical data fields are displayed, file type mapper 304 may display the required canonical data fields in a way that visually distinguishes the required canonical data fields from the optional canonical data fields. For example, the required canonical data fields may be displayed in bold text, underlined, italicized, highlighted, displayed in a text color different from the text color used to display the optional canonical data fields, displayed higher in a list than the optional canonical data fields, or displayed in a separate column from the optional canonical data fields.

In some embodiments, file type mapper 304 may display the content included in the source electronic data file (or a portion thereof) in response to receiving user selection of the transformation template. The content may be displayed in a native document viewer associated with the source electronic data file (e.g., a spreadsheet viewer if the file is a spreadsheet), in a web browser, or in the displayed interface for receiving file type mappings. File type mapper 304 may prompt the user to select one or more data fields included in the source electronic data file and may receive selection from the user of the data fields via I/O 204. For example, when the source electronic data file is a spreadsheet, the data fields may be spreadsheet columns and the user may provide selection of the data fields in the form of selection of the column headers. In response to receiving user selection of the data fields, file type mapper 304 may display a drop-down menu above each column header. Each drop-down menu may include the list of canonical data fields associated with the transformation template. The user may select the canonical data field that corresponds to each data field included in the source electronic data file by selecting the appropriate canonical data field from each drop-down box via I/O 204. Identifying the canonical data fields that correspond to the data fields included in the source electronic data file forms the basis for transforming the format of data fields and data included in an electronic data file so that they conform to or match the data fields and data of the canonical format for generating the transformed electronic data file. Accordingly, once the file type profile has been generated for a new file type, all source electronic data files received at data mapper 224 of the new file type may be automatically transformed without user intervention.

In some embodiments, one or more data fields included in a source electronic data file may not directly correspond to a canonical data field associated with a transformation template. For example, a transformation template may include a canonical data field "Date/Time" but the selected electronic data file includes "Date" and "Time" in separate data fields. If the user selects one of the "Date" and "Time" data fields as corresponding to the "Date/Time" canonical data field, file type mapper 304 may display a notification that a mapping error has occurred (i.e., the format of the data in the selected data field does not match the format required by the canonical data field). The notification may take on many forms including, for example, highlighting the column header of the data field selected by the user, highlighting the entire column associated with the date field selected by the user, a graphical symbol (e.g., an exclamation point, triangle, flag, etc.), or any combination thereof. File type mapper 304 may further display a dialog box along with the notification that describes the mapping error to the user. It is to be understood that the type of mapping errors detectable by file type mapper 304 is not limited to the above example and that other types of mapping errors are contemplated, including the data associated with a data field being in a format different from the format required by the canonical data field (e.g., $5M instead of $5,000,000, 12-hour time instead of 24-hour time, DD/MM/YY instead of MM/DD/YYYY, etc.), the data associated with a data field being a type of data different from the type of required by the canonical data field (e.g., dollars instead of date, name instead of phone number, etc.), and other types of mapping errors.

File type mapper 304 may correct mapping errors based on input received from the user via I/O 204. For example, if the transformation template includes a "Date/Time" canonical data field but the selected source electronic data file includes "Date" and "Time" in separate data fields, the user may select the "Date" and "Time" data fields and provide instructions to file type mapper 304 for combining the "Date" and "Time" data fields. In some embodiments, the interface for receiving file type mappings may include a list of mapping options for manipulating data fields and data included in a source electronic data file. One mapping option may be the option to combine data fields or columns. Accordingly, the user may provide instructions to file type mapper 304 for combining the "Date" and "Time" data fields by selecting the mapping option to combine data fields via I/O 204. In some embodiments, the user may provide instructions to file type mapper 304 for combining the "Date" and "Time" data fields by dragging and dropping one data field over the other data field. Other mapping options may include, for example, modifying date formats (e.g., MM/DD/YY to MM/DD/YYYY), modifying time formats (e.g., 12-hour to 24-hour, changing time zones), modifying number formats (e.g., adding currency symbols, changing the number of decimal places, performing arithmetic for two or more columns of data such as adding or subtracting data in different columns, converting numbers to different units), modifying telephone number formats (e.g., 123.456.7890 to (123) 456-7890), modifying name formats (e.g., First M. Last to Last, First M.), modifying geographic coordinates (e.g., converting between coordinate systems), and other mapping options.

Once file type mapper 304 has received all the file type mappings for the new file type profile, the user may name the file type and provide instructions via I/O 204 for file type mapper 304 to save the finalized file type profile in file type database 306. Accordingly, each file type profile includes a file type name, a file format associated with the file type, an identifier (i.e., content that may be identified in a source electronic data file that indicates the data file is of the file type), an indication of the transformation template associated with the file type, and file type mappings for transforming the data fields and data included in source electronic data files of the file type to conform or match the canonical format of the transformation template.

Once file type detector 302 has detected the file type of a source electronic data file, file type detector 302 may provide the associated file type profile to data transformer 310 for transforming the data included in source electronic data files for generating transformed source electronic data files. In some embodiments, data transformer 310 may include a template selector 312 that determines the transformation template associated with the file type of the source electronic data file. For example, template selector 312 may analyze the file type profile to determine the transformation template assigned to the file type by a user or file type mapper 304. Template selector 312 may retrieve the determined transformation template and provide it to template applicator 314.

Template applicator 314 may transform the data included in source electronic data files to conform to or match the canonical format of the transformation template. In some embodiments, template applicator 314 may transform the data based on the canonical format of the transformation template and the file type mappings included in the file type profile. As stated above, the file type mappings may specify the data fields in a source electronic data file that correspond to the canonical data fields of the transformation template. Accordingly, template applicator 314 may transform the data fields in the source electronic data file by modifying the format of the data fields to conform to or match the format canonical data fields. For example, if the format canonical data fields specifies an order of the data fields (e.g., spreadsheet columns of a "U.S. Bank wire transfer bank transaction" file type are to be ordered as "Transfer To," "Transfer From," "Transfer Amount," and "Transfer Date") and the order of the data fields in the source electronic data file does not match the specified order (e.g., they are ordered as "Transfer Date," "Transfer To," "Transfer From," and "Transfer Amount"), template applicator 314 may reorder the data fields to match the order specified by the format of the canonical data fields. As another example, if the format canonical data fields specifies "Date/Time" as one data field and the source electronic data file includes separate data fields for "Date" and "Time," template applicator 314 may combine the data fields to match the canonical data field.

Template applicator 314 may transform the data in the source electronic data file by modifying the format of the data to conform to or match the format of the data specified by the transformation template. For example, if the source electronic data file represents dollar amounts with two decimal places (e.g., $1,000.56) and the transfer template specifies that dollar amounts are to have no decimal places, template applicator 314 may round the decimal places in the electronic data file using various methods (e.g., round all dollar values down to the nearest whole dollar value, round all dollar values up to the nearest whole dollar value, round up if the decimal is ≥0.50, round down in the decimal is <0.50, etc.). As another example, if the source electronic data file represents time values in a 24-hour format (e.g., 16:34) and the transfer template specifies that time values are to be represented in a 12-hour format, template applicator 314 may convert the time values in the source electronic data file to a 12-hour format (e.g., 4:34 or 4:34 p.m.).

Once template applicator 314 has transformed a source electronic data file to conform to or match a transformation template, data mapper 224 may store the transformed data as a transformed source electronic data file in source file database 212.

File type detector 302, file type mapper 304, data transformer 310, template selector 312, and template applicator 314 may be implemented as a hardware modules configured to execute the functions described herein. Alternatively, one or more processors suitable for the execution of instructions may be configured to execute the functions of components 302, 304, 310, 312, and 314, which may be stored in a physical memory (not shown) communicatively coupled to the processor. As another example, the functions of file components 302, 304, 310, 312, and 314 may be included in the processor itself such that the processor is configured to implement these functions.

While file type database 306 and template database 308 are shown to be included in data mapper, one or more of databases 306 and 308 may be implemented by database 140 and/or 170 of FIGS. 1A and 1B. In some embodiments, one or more of databases 306 and 308 may be included in the same database. In some embodiments, one or more of databases 306 and 308 may be included in separate databases.

Figure 4:
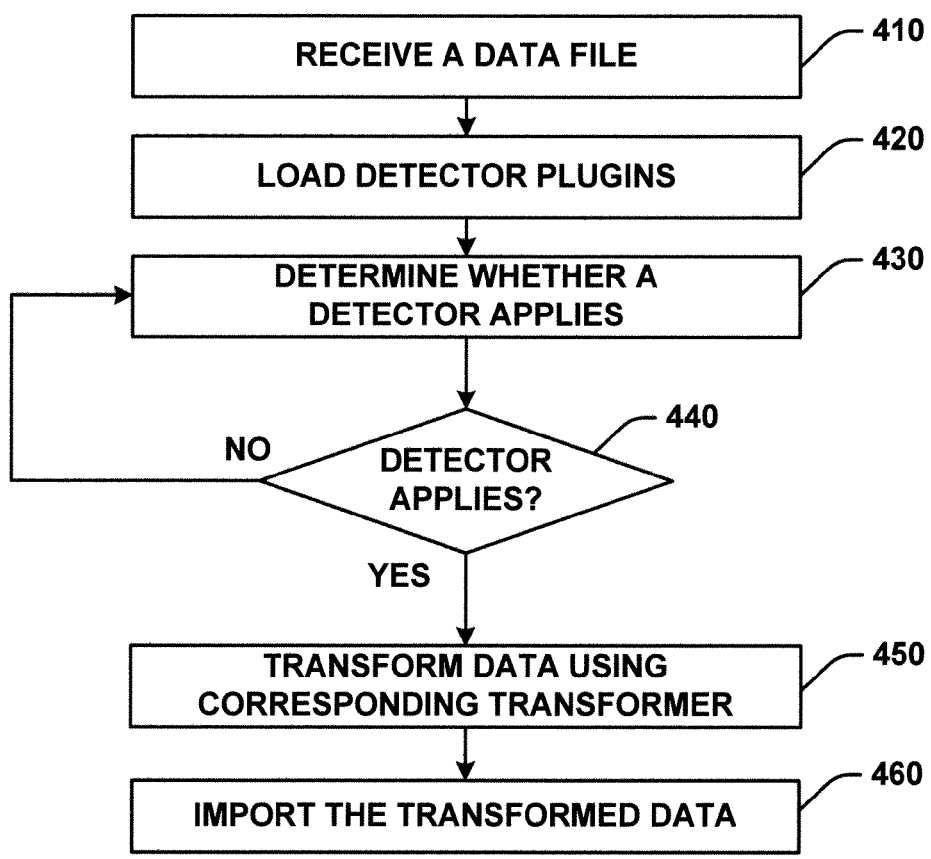
FIG. 4 is a flow diagram depicting an exemplary method for importing data from electronic data files, consistent with embodiments of the present disclosure.

FIG. 4 depicts a flowchart of an example method 400, consistent with some embodiments and aspects of the present disclosure. Method 400 may be implemented, for example, for importing electronic data files into one or more data analysis systems and/or databases. The number and sequence of operations in FIG. 4 are provided for purposes of illustration and may be modified, enhanced, substituted, or otherwise changed, in view of the present disclosure. In some embodiments, method 400 may be implemented as one or more computer programs executed by one or more processors. Moreover, in some embodiments, aspects of method 400 may be implemented by a data importation system (e.g., data importer 130 of FIG. 2A-2D having one or more processors executing one or more computer programs stored on a non-transitory computer readable medium).

In some embodiments, example method 400 may include receiving an electronic data file at 410. For example, the data importation system may receive source electronic data files from one or more client devices via a communications interface (e.g., communications interface 202 of FIG. 2A-2D). The electronic data files may be any electronic file format that includes various types of content. The content may include, for example, text information, binary data, images, graphics, sounds, videos, etc.

In some embodiments, example method 400 may include loading one or more detector/transformer plugins at 420. The data importation system may include a data detector (e.g., data detector 210 of FIG. 2A-2D) that may obtain the detector/transformer plugins from a database (e.g., detector/transformer plugin database 214 of FIG. 2A-2D). In some embodiments, the data detector may load all detector/transformer plugins included in the database while in some other embodiments, the data detector may load only a portion of the detector/transformer plugins.

In some embodiments, example method 400 may include determining whether a detector of the loaded detector/transformer plugins applies to the received source electronic data file at 430. If a detector does not apply to the source electronic data file (440—NO), the data detector moves onto the next detector/transformer plugin and determines if the detector applies. The data detector cycles through detector/transformer plugins until it finds a detector that applies to the received source electronic data file (440—YES) or until the data detector runs out of detector/transformer plugins.

In order to determine whether a detector/transformer plugin applies to the received source electronic data file, the data detector may load or execute each detector of the detector/transformer plugins to determine whether its corresponding transformer is capable of transforming the received source electronic data file. The data detector may determine the order in which detectors are compared to the source electronic data file based on priorities assigned to the detector/transformer plugins. For example, higher priority plugins may be compared before lower priority plugins. As another example, the data detector may only load and compare high priority plugins to the received source electronic data file.

In some embodiments, example method 400 may include transforming the data included in the received source electronic data file at 450. For example, the data importation system may include a data transformer (e.g., data transformer 218 of FIG. 2A-2D) that transforms the data included in received source electronic data file using the transformer of the detector/transformer plugin determined at 430. The transformed data may be stored in a transformed electronic data file which may be stored in a database (e.g., transformed data database 220 of FIG. 2A-2D).

In some embodiments, example method 400 may include importing the transformed data at 460. For example, the data importation system may include a data analysis system I/F (e.g., a data analysis system I/F 220 of FIG. 2A-2D) that provides transformed data to one or more data analysis systems and/or databases.

Figure 5:
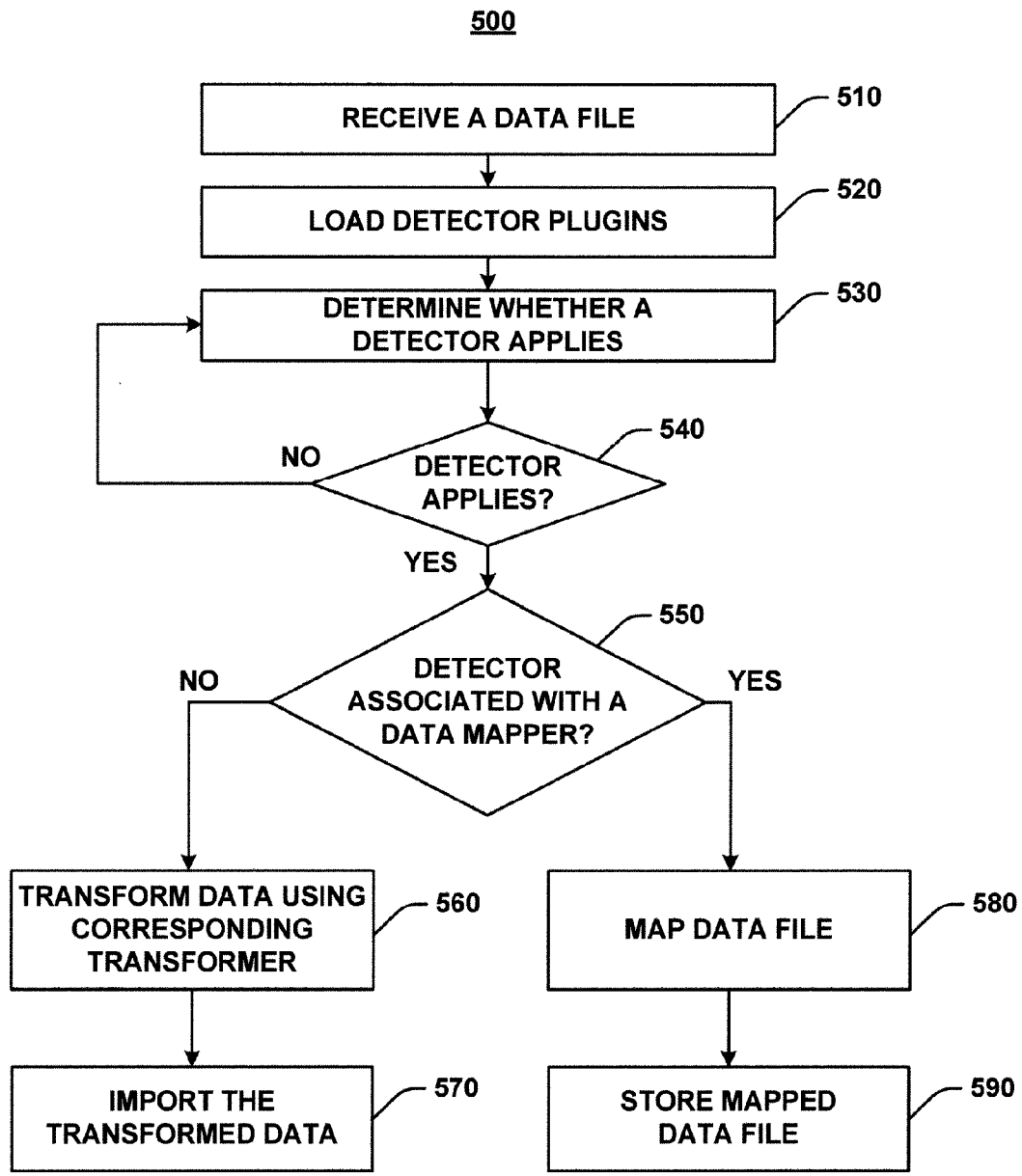
FIG. 5 is a flow diagram depicting another exemplary method for importing data from electronic data files, consistent with embodiments of the present disclosure.

FIG. 5 depicts a flowchart of an example method 500, consistent with some embodiments and aspects of the present disclosure. Method 500 may be implemented, for example, for importing data from electronic data files. The number and sequence of operations in FIG. 5 are provided for purposes of illustration and may be modified, enhance, substituted, or otherwise changed, in view of the present disclosure. In some embodiments, method 500 may be implemented as one or more computer programs executed by one or more processors. Moreover, in some embodiments, aspects of method 500 may be implemented by a data importation system (e.g., data importer 130 of FIG. 2B having one or more processors executing one or more computer programs stored on a non-transitory computer readable medium).

In some embodiments, example method 500 may include receiving a source electronic data file at 510 and loading one or more detector/transformer plugins at 520. The detectors of the loaded detector/transformer plugins may be compared to the received source electronic data file to determine whether a detector/transformer plugin applies to the received source electronic data file at 540. If a detector does not apply to the source electronic data file (540—NO), the data detector moves onto the next detector/transformer plugin and determines if the detector applies. The data detector cycles through detector/transformer plugins until it finds a detector that applies to the received source electronic data file (540—YES) or until the data detector runs out of detector/transformer plugins.

When it is determined that a detector/transformer plugin applies (540—YES), example method 500 may include determining whether the detector/transformer plugin is associated with a data mapper at 550. The detector/transformer plugin may be associated with a data mapper when it applies to the received source electronic data file, and the data mapper is able to detect a file type for the received source electronic data file.

If the detector/transformer plugin is not associated with a data mapper at (550—NO), example method 500 may include transforming the data included in the received source electronic data file at 560 and importing the transformed data at 570 similar to example method 400. If the detector/transformer plugin is associated with a data mapper at (550—YES), example method 500 may include mapping the source electronic data file at 580 and storing the mapped version of the source file at 590. In some embodiments, the data importation system may include a data mapper (e.g., data mapper 224 of FIGS. 2B and 3) that allows the user to perform a workflow to map the format of the source electronic data file to a canonical format included in a transformation template so that the mapped data can be detected and transformed by the data importation system.

Figure 6:
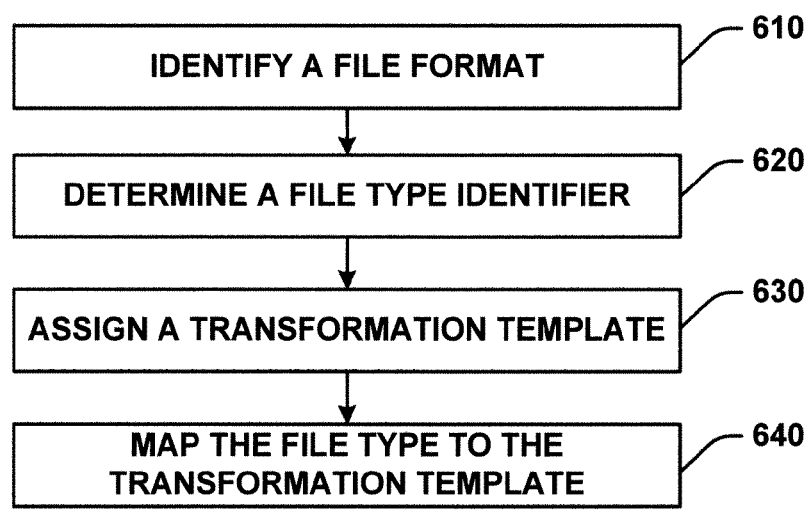
FIG. 6 is a flow diagram depicting an example method for generating file type profiles, consistent with embodiments of the present disclosure.

FIG. 6 depicts a flowchart of an example method 600, consistent with some embodiments and aspects of the present disclosure. Method 600 may be implemented, for example, for generating file type profiles. The number and sequence of operations in FIG. 6 are provided for purposes of illustration and may be modified, enhance, substituted, or otherwise changed, in view of the present disclosure. In some embodiments, method 600 may be implemented as one or more computer programs executed by one or more processors. Moreover, in some embodiments, aspects of method 600 may be implemented by a data importation system (e.g., data importer 130 of FIG. 2B having one or more processors executing one or more computer programs stored on a non-transitory computer readable medium).

In some embodiments, example method 600 may include identifying a file format at 610. For example, the data importation system may include a data mapper (e.g., data mapper 224 of FIGS. 2B and 3) that includes a file type detector (e.g., file type detector 302 of FIG. 3). The file type detector may include a file type mapper (e.g., file type mapper 304 of FIG. 3) for identifying the file format of a source electronic data file based on input from a user. The user may, for example input selection of the file format by selecting the file format from a plurality of file formats included in a drop-down box or a list. As another example, the file type mapper may identify the file format based on properties of the source electronic data file. For example, the file type mapper may analyze the file name of the source electronic data file to identify a file extension (e.g., .csv, .xls, .tsv, etc.). Accordingly, the file type mapper may identify the file format associated with the file extension of the source electronic data file.

In some embodiments, example method 600 may include determining a file type identifier at 620. The file type identifier may be, for example, a portion of the content included in the source electronic data file that can be used as an identifier of the file type. The file type mapper may determine the file type identifier based on input from a user. The user may, for example input selection of the content that can be used to identify the file type (e.g., combinations of data fields, types of data, text strings, headings, descriptions, arrangements of data fields, structure of the data file, etc.).

In some embodiments, example method 600 may include assigning a transformation template at 630. For example, the file type mapper may display options for a user to assign a transformation template to the file type of the source electronic data file. For example the file type mapper may obtain transformation templates from a database (e.g., template database 308 of FIG. 3). The file type mapper may display all or a portion of the transformation templates stored in the database. For example, the file type mapper may display a portion of the transformation templates based on the file format identified at 610, based on the provider of the source electronic data file, or based on other criteria. The file type mapper may display the transformation templates as a list of transformation templates (e.g., in the form of a drop-down box or a list of check boxes) and may receive the user may input in the form of selection of the transformation template for the file type.

In some embodiments, example method 600 may include mapping the file type to the assigned transformation template at 640. The file type mapper may map the file type determined at 620 to the transformation template assigned at 630. For example, the file type mapper may receive input from the user that indicates a mapping of canonical data fields included in the transformation template to corresponding data field included in the source electronic data file. The file type mapper may also receive input from the user for correcting any differences between the format of the canonical data fields and the format of corresponding data field included in the source electronic data file. Once the file type has been mapped to the assigned transformation template at 640, the data mapper may store the completed file type profile in a database (e.g., file type database 306 of FIG. 3).

FIG. 7A-7C depict illustrations of an example importer GUI 700 generated by a data importation system (e.g., data importer 130 of FIG. 2A-2D). Importer GUI 700 may be used for importing data from electronic data files, according to some embodiments of the present disclosure. Importer GUI 700 may be generated by a GUI generator (e.g., GUI generator 206 of FIG. 2A-2D) of the data importation system.

As shown in FIG. 7A, importer GUI 700 may provide the user with an interface for managing electronic data files (e.g., uploading, updating, deleting, downloading, mapping, etc.). Importer GUI 700 may include one or more tabs 720 that allow the user to associate electronic data files with case files (e.g., legal proceedings, legal processes, investigations, etc.). The user may browse through the various tabs 702 by selecting a respective tab. A selected tab 720 may display the electronic data files that have been associated with the case file assigned to that tab. While FIG. 7A shows case files as tabs 720, it is to be understood that other embodiments are contemplated without departing from the scope of the disclosure. For example, case files may be listed in a drop-down menu and the user may select a case file to be displayed from the drop down menu.

Once the desired tab 702 has been selected, importer GUI 700 may display the electronic data files associated with the case file assigned to the selected tab 702. The display may include various columns of information including associated with the electronic data files, for example, file name 704, data type 706, and data modified 708. Importer GUI 700 may display a visual indicator of the file types 706 instead of the text description shown in FIG. 7A. For example, importer GUI 700 may display a spreadsheet icon for an Excel file or a .csv file, a notepad or Word icon for a text file, an envelope for a email file, etc.

Importer GUI 700 may also include an upload button 710 for initiating upload of source electronic data files. Importer GUI 700 may display a pop-up window that allows the user may to browse local and networked file systems to select one or more source electronic data files for uploading.

Importer GUI 700 may allow users to interact with the electronic data files displayed for a given case file. For example, importer GUI 700 may display a pop-up window presenting the user with various options in response to a user interacting with an electronic data file. The options presented in the pop-up box may depend on the type of file with which the user interacts. In FIG. 7B, a user has interacted with FILE1.TXT, an electronic data file containing text. In response, importer GUI 700 displays a pop-up box 712 that includes options to process, download, update, and delete the file. The user may select the process option to transform the file using a detector/transformer plugin. In addition, importer GUI 700 may display a visual indicator associated with the status of the processing of each file. In some embodiments, the pop-up box may include additional options, e.g., claw-back, modify, redact, or annotate a file.

In FIG. 7C, a user has interacted with FILE3.XLS, an electronic data file that can be mapped by a data mapper. In response, importer GUI 700 displays a pop-up box 714 that includes options to map data, download, update, and delete the file. The user may select the map data option to present a mapper GUI that allows the user to map the data included in the file to a transformation template.

Figure 8A:
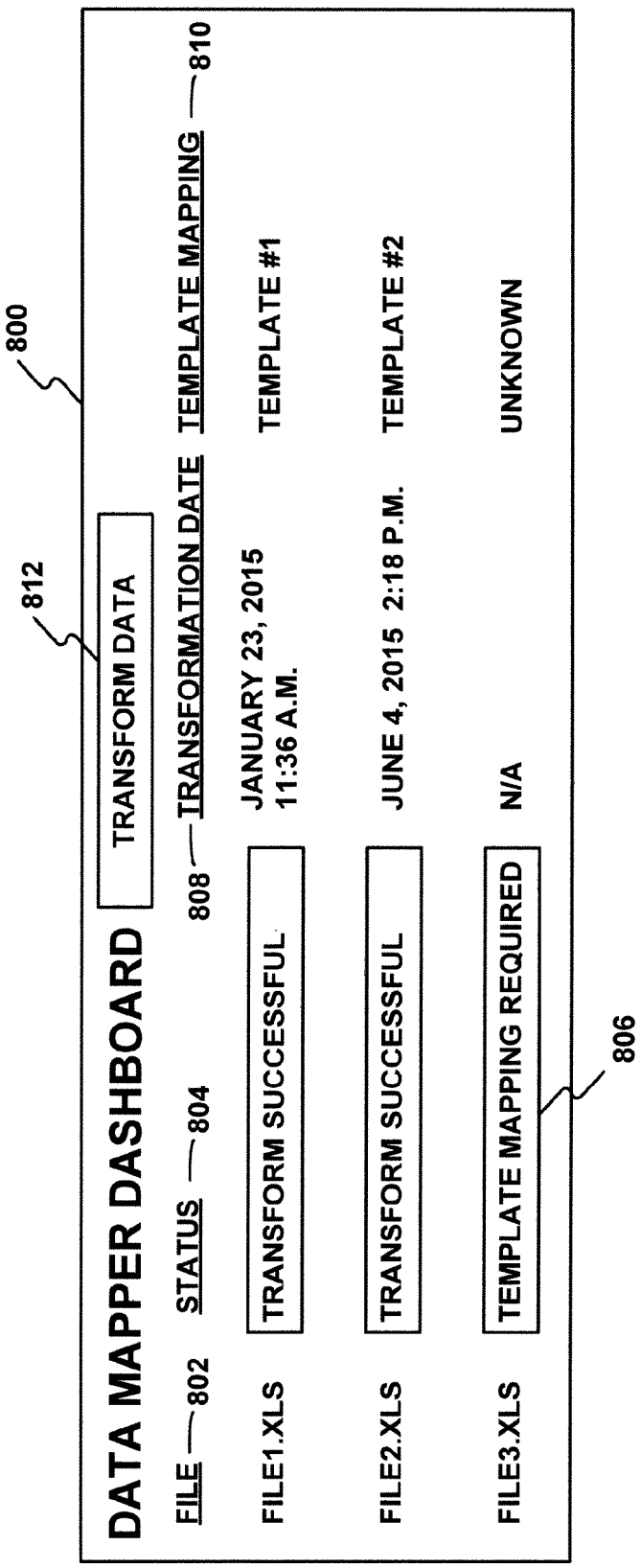

FIGS. 8A-8D depict illustrations of an example mapper GUI 800 generated by a data mapper (e.g., data mapper 224 of FIGS. 2B and 3). Mapper GUI 800 may be used to map electronic data files and to generate file type profiles, according to some embodiments of the present disclosure. FIG. 8A depicts a dashboard view of mapper GUI 800. The dashboard view may display the status of various source electronic data files managed by the data importation system (e.g., data importer 130 of FIG. 2B). The status of each source electronic data file may include a file name 802, transformation status 804, transformation date 808, and the template mapping 810 that is used to transform the source electronic data file. It is to be understood that the number of files illustrated in the example dashboard view of mapper GUI 800 is merely an example and that any number of files may be displayed. Moreover, the dashboard view of mapper GUI 800 may be configured to display subset of the files stored in the data importation system's source file database at one time. When a subset of the files is displayed, the dashboard view of mapper GUI 800 allows the user to scroll through the list of source electronic data files stored in the source file database and to change the subset of files displayed. Moreover, the dashboard view of mapper GUI 800 may be configured to filter files stored in the source file database according to, for example, file type, file format, importation status, etc., in order to display a subset of the stored files.

File name 802 may list the file name and file format of each electronic data file stored in the data importation system's file database. Transformation status 820 may list the importation status of each file. In some embodiments, the transformation status 804 of each file may include an indicator 806 that indicates whether the data included in each file has been successfully transformed (i.e., transformed into a transformed source electronic data file). Indicator 806 may be a visual indicator that notifies the user of the data importation system that transformation of a given file was successful or that additional information is required in order to transform the file. Moreover, indicator 806 may be an interactive indicator that includes a hyperlink. The data mapper may display a file type profile generator view in response to the user interacting with the hyperlink. It is to be understood that indicators 806 illustrated in FIG. 8A are merely an example and that indicators 806 may be, for example, a pop-up text box, a flag, an email message, an error report, or any visual indicators known in the art and combinations thereof.

Transformation date 808 may list the date that the transformation of a given file was completed successfully. For example, as shown in FIG. 8A, transformation date 808 may include the date and time of successful transformation of each file. In some embodiments, transformation date 808 may include only the date of successful transformation. In some embodiments, the date and/or time listed in transformation date 808 may be displayed in various formats such as, for example, date/time, time/date, in a "MM/DD/YY" date format, in a "Month Date, Year" date format, in 12-hour time format, in 24-hour time format, etc.

Template mapping 810 may list the transformation template that was used to transform the data in a given file. For example, template mapping 810 may display the name of the transformation template (e.g., weather buoy data) that was used to transform the data in a given file.

Transform data button 812 may include a graphical representation of a push button and an underlying hyperlink. The hyperlink, when interacted with by a user, may provide instructions to the data mapper to transform data included in one or more source electronic data files. In some embodiments, the data mapper may transform the data included in all source electronic data files stored in the source file database. For example, the data mapper may analyze each file to determine if there are any source electronic data files stored in the source file database that haven't yet been transformed. If the data mapper determines that a source electronic data file has already been transformed, the data mapper moves to the next file without retransforming that file. In some embodiments, the data mapper may transform data included in source electronic data file that have been selected by the user for transformation.

Figure 8B:
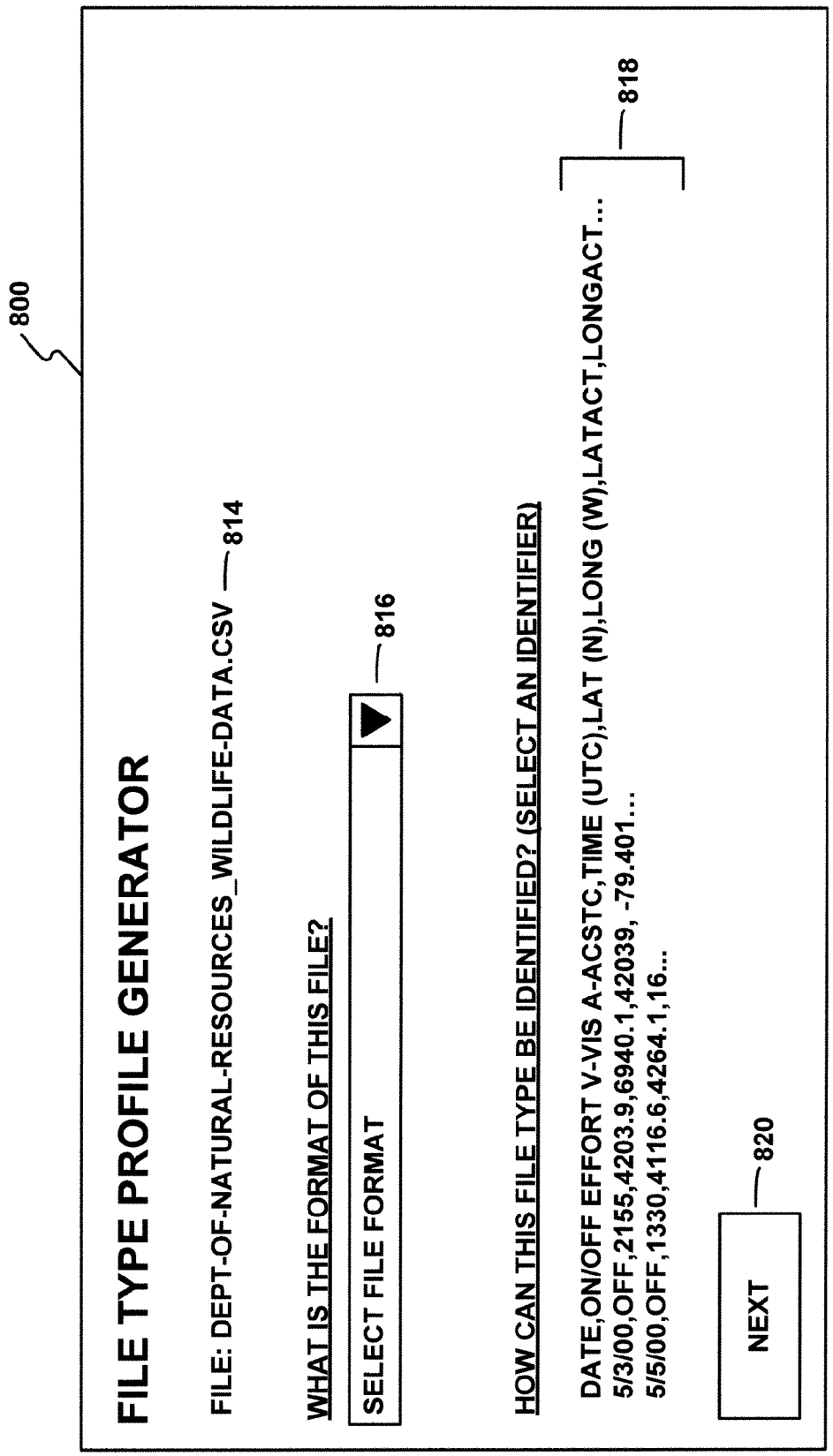

FIG. 8B, illustrates a file type profile generator view of mapper GUI 800. In some embodiments, the file type profile generator view may be displayed in response to the user interacting with an underlying hyperlink of an indicator 806. The file type profiler generator view may display the file name 814 of the selected source electronic data file, a file format selector 816, content 818 included in the selected source electronic data, and a generator button 820 for initiating mapping of the file type associated with the selected source electronic data file to a transformation template.

Format selector 816 may allow the user to select a file format associated with the source electronic data file. As illustrated in FIG. 8B, format selector 816 may be implemented as a drop-down box that may expand to display a list of file formats selectable by the user. For example, the user may expand format selector 816 to select the .csv file format since the selected source electronic data file is a .csv file.

Content 818 may include a subset of the content included in the selected source electronic data file. For example, content 818 may include strings of text, column headers, data, or any other content included in the source electronic data file. In some embodiments, content 818 may be displayed so that the user can select a portion of content 818 that can be used by the data mapper to identify a file type associated with the selected source electronic data file. The user may select a portion of content 818 by highlighting combinations of data fields, headings, descriptions, data provider codes, and text strings included in content 818.

Once format selector 816 has received selection of the file format associated with the source electronic data file and the user has selected a portion of content 818, the user may select generator button 820 to continue with generating the file type profile. A file type mapper view of mapper GUI 800 may be displayed in response to the user's selection of generator button 820.

Figure 8C:
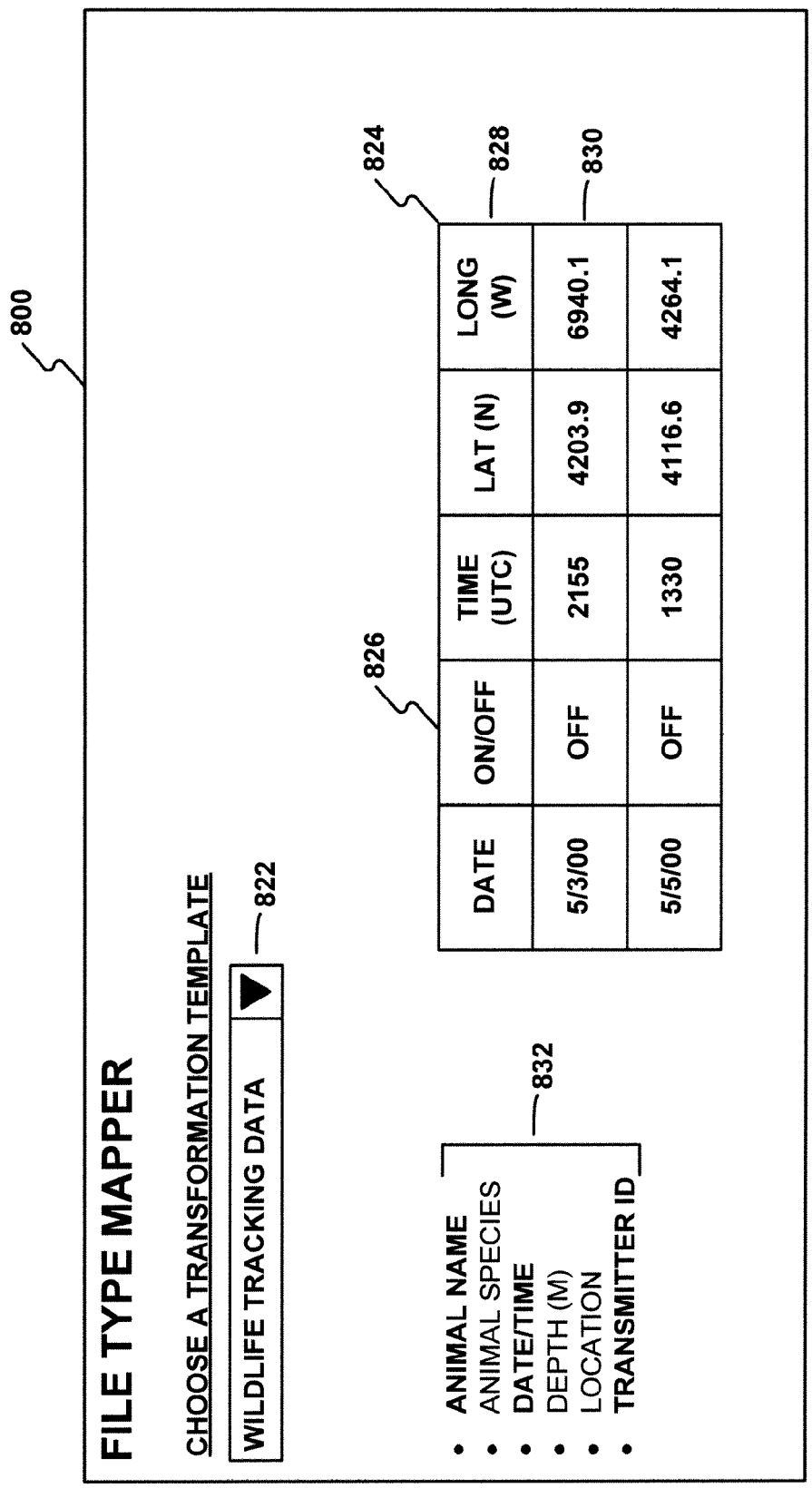

FIG. 8C illustrates an example file type mapper view of mapper GUI 800, according to some embodiments of the present disclosure. As shown in FIG. 8C, the file type mapper view may include a transformation template selector 822 and content 824. Template selector 822 may allow the user to assign a transfer template to the file type profile being generated. As illustrated in FIG. 8C, template selector 822 may be implemented as a drop-down box that may expand to display a list of transformation templates selectable by the user.

Content 824 may include content included in the selected source electronic data file. While content 824 is shown in FIG. 8C as being embedded in the file type mapper view of mapper GUI 800, content 720 may instead be displayed in a native document viewer associated with selected source electronic data file (e.g., a spreadsheet viewer if the file is a spreadsheet) or in a separate a web page. As shown in FIG. 8C, content 824 may be displayed in a matrix format and include a plurality of data fields 826. Each data field 826 of the matrix may include a column header 828 and data 830.

The file type mapper view may display a list of canonical data fields 832 in response to receiving the user's selection of a transformation template at template selector 822. Canonical data fields 822 may include data fields required by the selected transformation template and data fields that are optional. As illustrated in FIG. 8C, the required canonical data fields are visually distinguished from the optional canonical data fields by displaying the required data fields in bold text.

As illustrated in FIG. 8D, file type mapper view of mapper GUI 800 may also display drop-down boxes 834 above column headers 828. Each drop-down menu may include the list of canonical data fields 832 associated with selected transformation template. The user may map canonical data fields 832 to data fields 826 by selecting the canonical data field 832 from the drop-down menu that corresponds to each data field 826 of content 824.

Figure 9:
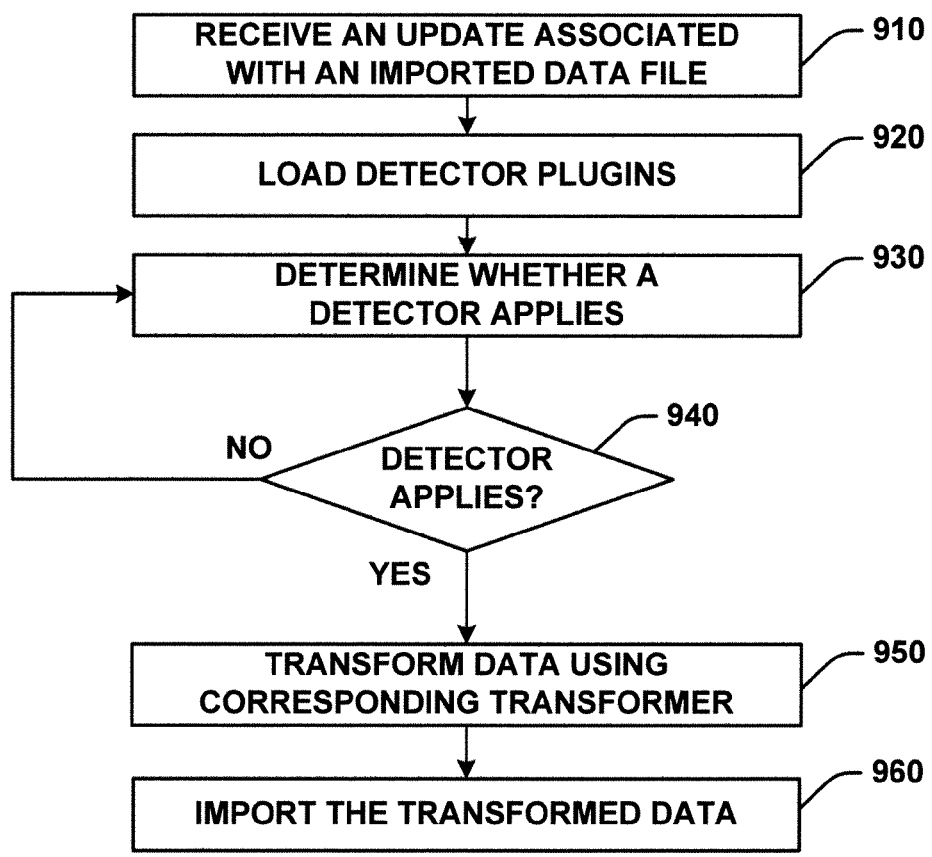
FIG. 9 is a flow diagram depicting an exemplary method for updating electronic data files, consistent with embodiments of the present disclosure.

FIG. 9 depicts a flowchart of an example method 900, consistent with some embodiments and aspects of the present disclosure. Method 900 may be implemented, for example, for updating electronic data files. The number and sequence of operations in FIG. 9 are provided for purposes of illustration and may be modified, enhance, substituted, or otherwise changed, in view of the present disclosure. In some embodiments, method 900 may be implemented as one or more computer programs executed by one or more processors. Moreover, in some embodiments, aspects of method 900 may be implemented by a data importation system (e.g., data importer 130 of FIG. 2C having one or more processors executing one or more computer programs stored on a non-transitory computer readable medium).

In some embodiments, example method 900 may include receiving an update associated with a source electronic data file at 910. The update may be received from a user via input to the data importation system or from a data analysis system. In response to receiving the update, the data importation system may load one or more detector/transformer plugins at 920 so that the data importation system may transform the updated source electronic data file and import the updates from the data importation system to one or more data analysis systems and/or databases. The detectors of the loaded detector/transformer plugins may be loaded or executed with the updated source electronic data file to determine whether a detector/transformer plugin applies to the updated source electronic data file at 940. If a detector does not apply to the updated source electronic data file (940—NO), the data detector of the data importation system moves onto the next detector/transformer plugin and determines if the detector applies. The data detector cycles through detector/transformer plugins until it finds a detector that applies to the updated source electronic data file (940—YES) or until the data detector runs out of detector/transformer plugins. The data importation system's data transformer transforms the data included in updated source electronic data file at 950 using the transformer of the detector/transformer plugin determined at 930. The transformed data may be stored in a transformed electronic data file which may be stored in a database (e.g., transformed data database 220 of FIG. 2C) and may be imported into one or more data analysis systems and/or databases at 960.

Figure 10:
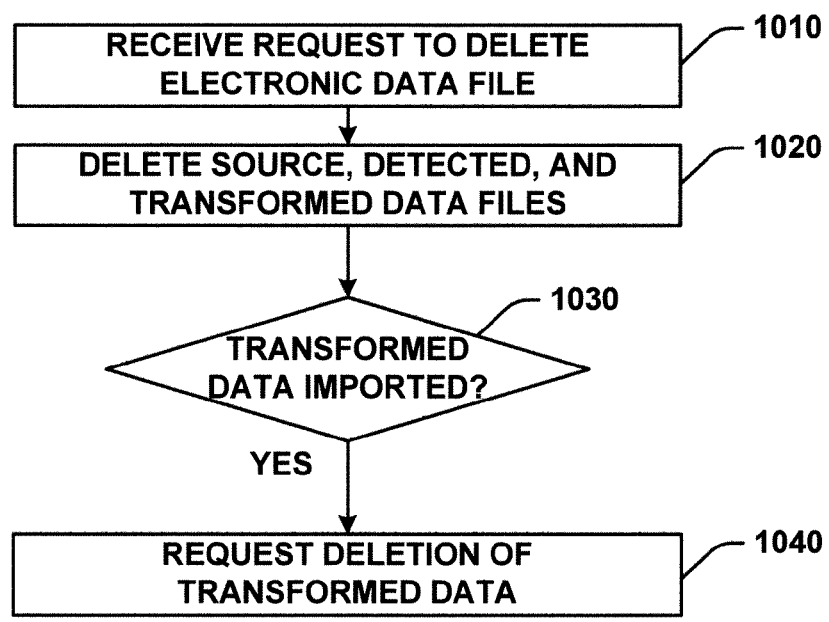
FIG. 10 is a flow diagram depicting an exemplary method for deleting electronic data files, consistent with embodiments of the present disclosure.

FIG. 10 depicts a flowchart of an example method 1000, consistent with some embodiments and aspects of the present disclosure. Method 1000 may be implemented, for example, for deleting electronic data files. The number and sequence of operations in FIG. 10 are provided for purposes of illustration and may be modified, enhance, substituted, or otherwise changed, in view of the present disclosure. In some embodiments, method 1000 may be implemented as one or more computer programs executed by one or more processors. Moreover, in some embodiments, aspects of method 1000 may be implemented by a data importation system (e.g., data importer 130 of FIG. 2D having one or more processors executing one or more computer programs stored on a non-transitory computer readable medium).

In some embodiments, example method 1000 may include receiving a request to delete a source electronic data file at 1010. The request may be received from a user via input to the data importation system or from a data analysis system. In response to receiving the update, the data importation system may delete the source electronic data file as well was the detected and transformed electronic data files associated with the source electronic data file at 1020. At 1030, the data importation system determines if any transformed data associated with the source electronic data file has been imported into any data analysis systems and/or databases. If transformed data associated with the source electronic data file has been imported (1030—YES), the data importation system may send a request to the data analysis systems and/or databases to delete the imported data at 1040. The data analysis systems and/or databases may receive the request and delete the appropriate imported data.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A system comprising:
   one or more memory devices that store a set of instructions; and
   at least one processor that executes the set of instructions to perform operations for generating an updated transformed electronic data file using a detector/transformer plugin, the detector/transformer plugin including a detector and a transformer, the detector configured to detect whether an updated electronic source data file is compatible with the transformer, the transformer configured to transform the updated source electronic data file into the updated transformed electronic data file, the operations comprising:
receiving the source electronic data file;
receiving an update to the source electronic data file as an updated electronic source data file;
loading the detector/transformer plugin from a database based on a detection by the detector of the detector/transformer plugin that the updated electronic source data file is compatible with the transformer, the detection based on a file type of the updated electronic source data file;
performing the transforming of the updated source electronic data file into the updated transformed electronic data file using the transformer of the detector/transformer plugin; and
providing the updated transformed electronic data file for importing into a data analysis system.

2. The system of claim 1, wherein an order in which detectors of a plurality of detector/transformer plugins in the database are determined to apply to the updated source electronic data file is determined based on priorities assigned to the plurality of detector/transformer plugins.

3. The system of claim 1, the operations further comprising storing transformed data in the updated transformed electronic data file.

4. The system of claim 1, the operations further comprising:
receiving a request to delete the source electronic data file; and
deleting the source electronic data file.

5. The system of claim 4, the operations further comprising providing a request to the data analysis system to delete transformed data corresponding to the source electronic data file.

6. A method comprising:
performing operations for generating an updated transformed electronic data file using a detector/transformer plugin, the detector/transformer plugin including a detector and a transformer, the detector configured to detect whether an updated electronic source data file is compatible with the transformer, the transformer configured to transform the updated source electronic data file into the updated transformed electronic data file, the operations comprising:
receiving the source electronic data file;
receiving an update to the source electronic data file as an updated electronic source data file;
loading the detector/transformer plugin from a database based on a detection by the detector of the detector/transformer plugin that the updated electronic source data file is compatible with the transformer, the detection based on a file type of the updated electronic source data file; and
performing the transforming of the updated source electronic data file into the updated transformed electronic data file using the transformer of the detector/transformer plugin; and
providing the updated transformed electronic data file for importing into data analysis system, one or more modules incorporated into one or more memories of a computer system to configure one or more processors of the computer system to perform the generating of the updated transformed electronic data file using the detector/transformer plugin.

7. The method of claim 6, wherein an order in which detectors of a plurality of detector/transformer plugins in the database are determined to apply to the updated source electronic data file is determined based on priorities assigned to the plurality of detector/transformer plugins.

8. The method of claim 6, the operations further comprising storing transformed data in the updated transformed electronic data file.

9. The method of claim 6, the operations further comprising:
receiving a request to delete the source electronic data file; and
deleting the source electronic data file.

10. The method of claim 9, the operations further comprising providing a request to the data analysis system to delete transformed data corresponding to the source electronic data file.

11. The method of claim 6, further comprising providing the transformed updated electronic data file to the data analysis system.

12. A non-transitory computer-readable storage medium comprising instructions that, when executed by at least one processor of a machine, cause the machine to perform operations for generating an updated transformed electronic data file using a detector/transformer plugin, the detector/transformer plugin including a detector and a transformer, the detector configured to detect whether an updated electronic source data file is compatible with the transformer, the transformer configured to transform the updated source electronic data file into the updated transformed electronic data file, the operations comprising:
receiving a source electronic data file;
receiving an update to the source electronic data file as an updated electronic source data file;
loading the detector/transformer plugin from a database based on a detection by the detector of the detector/transformer plugin that the updated electronic source data file is compatible with the transformer, the detection based on a file type of the updated electronic source data file;
performing the transforming of the updated source electronic data file into the updated transformed electronic data file using the transformer of the detector/transformer plugin; and
providing the updated transformed electronic data file for importing into the data analysis system.

* * * * *